United States Patent
Choi

(10) Patent No.: US 10,566,670 B2
(45) Date of Patent: Feb. 18, 2020

(54) ELECTROCHEMICAL CELL, ELECTROCHEMICAL CELL MODULE COMPRISING THE ELECTROCHEMICAL CELL, AND PREPARATION METHOD OF THE ELECTROCHEMICAL CELL

(71) Applicant: Samsung Electronics Co., Ltd., Suwon-si, Gyeonggi-do (KR)

(72) Inventor: Kyounghwan Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 627 days.

(21) Appl. No.: 15/133,303

(22) Filed: Apr. 20, 2016

(65) Prior Publication Data

US 2016/0322685 A1  Nov. 3, 2016

(30) Foreign Application Priority Data

Apr. 28, 2015 (KR) .................. 10-2015-0060087

(51) Int. Cl.
| | | |
|---|---|---|
| H01M 12/08 | (2006.01) | |
| H01M 2/16 | (2006.01) | |
| H01M 10/04 | (2006.01) | |
| H01M 10/0583 | (2010.01) | |
| H01M 12/02 | (2006.01) | |

(52) U.S. Cl.
CPC ......... *H01M 12/08* (2013.01); *H01M 2/1673* (2013.01); *H01M 10/045* (2013.01); *H01M 10/0583* (2013.01); *H01M 12/02* (2013.01)

(58) Field of Classification Search
CPC .. H01M 12/08; H01M 2/1673; H01M 10/045; H01M 10/0583
See application file for complete search history.

(56) References Cited

U.S. PATENT DOCUMENTS

| | | |
|---|---|---|
| 7,282,295 B2 | 10/2007 | Visco et al. |
| 7,691,536 B2 | 4/2010 | Johnson |
| 7,767,345 B2 | 8/2010 | Imagawa et al. |
| 7,824,806 B2 | 11/2010 | Visco et al. |
| 8,129,052 B2 | 3/2012 | Visco et al. |
| 8,691,444 B2 | 4/2014 | Visco et al. |

(Continued)

FOREIGN PATENT DOCUMENTS

| | | |
|---|---|---|
| EP | 1082776 B1 | 10/2001 |
| JP | 2013-073765 A | 4/2013 |

(Continued)

OTHER PUBLICATIONS

European Search Report for European Patent Application No. 16166254-9 dated Jun. 27, 2016.

*Primary Examiner* — Jonathan G Jelsma
(74) *Attorney, Agent, or Firm* — Cantor Colburn LLP

(57) ABSTRACT

An electrochemical cell including: an anode assembly having opposite surfaces; and a cathode having at least one folded portion and having ionic continuity with the opposite surfaces of the anode assembly, wherein the anode assembly includes an anode, and an active metal ion conducting membrane that is disposed between the anode and the cathode, wherein the active metal ion conducting membrane has at least one folded portion. Also an electrochemical cell, an electrochemical cell module including the electrochemical cell, and methods of manufacturing the same.

33 Claims, 16 Drawing Sheets

(56) References Cited

U.S. PATENT DOCUMENTS

| | | |
|---|---|---|
| 8,722,256 B2 | 5/2014 | Narula et al. |
| 8,871,394 B1 | 10/2014 | Garcia et al. |
| 2005/0191545 A1 | 9/2005 | Bowles et al. |
| 2007/0141431 A1 | 6/2007 | Wang et al. |
| 2007/0231704 A1 | 10/2007 | Inda |
| 2008/0070087 A1 | 3/2008 | Johnson |
| 2009/0136834 A1 | 5/2009 | Coowar et al. |
| 2010/0285375 A1* | 11/2010 | Friesen ............... H01M 12/06 429/405 |
| 2011/0033755 A1 | 2/2011 | Eitouni et al. |
| 2011/0059355 A1 | 3/2011 | Zhang et al. |
| 2011/0129739 A1 | 6/2011 | Nakanishi |
| 2011/0223494 A1 | 9/2011 | Feaver et al. |
| 2012/0077084 A1 | 3/2012 | Christensen et al. |
| 2012/0077095 A1 | 3/2012 | Roumi et al. |
| 2012/0115048 A1 | 5/2012 | Roev et al. |
| 2012/0141889 A1 | 6/2012 | Lee et al. |
| 2012/0237838 A1 | 9/2012 | Uesaka |
| 2012/0276459 A1 | 11/2012 | Im et al. |
| 2013/0108934 A1 | 5/2013 | Lee et al. |
| 2013/0115527 A1 | 5/2013 | Au |
| 2013/0224609 A1 | 8/2013 | Lee et al. |
| 2013/0330639 A1 | 12/2013 | Lee et al. |
| 2014/0011101 A1 | 1/2014 | Ma et al. |
| 2014/0162108 A1 | 6/2014 | Visco et al. |
| 2014/0178776 A1 | 6/2014 | Mitsuoka et al. |
| 2014/0234733 A1 | 8/2014 | Roev et al. |
| 2014/0335392 A1 | 11/2014 | Visco et al. |
| 2014/0356737 A1 | 12/2014 | Song |
| 2014/0356767 A1 | 12/2014 | Song |
| 2015/0024256 A1 | 1/2015 | Anandan et al. |
| 2015/0079485 A1 | 3/2015 | Choi et al. |
| 2015/0140452 A1 | 5/2015 | Park et al. |
| 2016/0043408 A1 | 2/2016 | Kwon et al. |
| 2016/0310748 A1* | 10/2016 | Aamodt ............... H01G 9/048 |
| 2016/0322684 A1* | 11/2016 | Choi ..................... H01M 12/08 |
| 2016/0322685 A1 | 11/2016 | Choi |
| 2017/0133732 A1* | 5/2017 | Kim ..................... H01M 12/08 |

FOREIGN PATENT DOCUMENTS

| | | | |
|---|---|---|---|
| KR | 1020130053818 A | 5/2013 |
| KR | 1020150058616 A | 5/2015 |
| KR | 1020160128039 A | 11/2016 |
| KR | 1020160128164 A | 11/2016 |

* cited by examiner

ELECTROCHEMICAL CELL, ELECTROCHEMICAL CELL MODULE COMPRISING THE ELECTROCHEMICAL CELL, AND PREPARATION METHOD OF THE ELECTROCHEMICAL CELL

CROSS-REFERENCE TO RELATED APPLICATION

This application claims priority to and the benefit of Korean Patent Application No. 10-2015-0060087, filed on Apr. 28, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to an electrochemical cell, an electrochemical cell module including the electrochemical cell, and a method of preparing the electrochemical cell.

2. Description of the Related Art

A metal-air battery is a type of electrochemical cell that includes an anode that may allow deposition/dissolution of metal ions, a cathode for oxidizing/reducing oxygen from the air, and a metal-ion conducting medium disposed between the cathode and the anode.

A metal-air battery may use a metal as the anode and may have a high capacity because it does not need to store air, which is used as a cathode active material. The metal-air battery may have a high theoretical energy density per unit weight of about 3500 Wh/kg or greater. However, currently available metal-air batteries provide only a fraction of the theoretical energy density. Therefore, there remains a need for a metal-air battery which provides improved discharge capacity and improved energy density.

SUMMARY

Provided is an electrochemical cell including an anode with opposite surfaces on which an active metal ion conducting membrane and a cathode may be disposed.

Provided is an electrochemical cell module including a plurality of the electrochemical cells.

Provided is a method of preparing the electrochemical cell.

Additional aspects will be set forth in part in the description which follows and, in part, will be apparent from the description, or may be learned by practice of the presented exemplary embodiments.

According to an aspect of an exemplary embodiment, an electrochemical cell includes: an anode assembly having opposite surfaces; and a cathode having at least one folded portion and having ionic continuity with the opposite surfaces of the anode assembly, wherein the anode assembly includes an anode, and an active metal ion conducting membrane that is disposed between the anode and the cathode, wherein the active metal ion conducting membrane has at least one folded portion.

Also disclosed is an electrochemical cell including: an anode assembly having opposite first and second surfaces; and a cathode surrounding the anode assembly and having at least one folded portion that is folded in a same direction as a folding direction of the anode assembly, and opposite first and second end portions disposed on the opposite first and second surfaces of the anode assembly, respectively, wherein the anode assembly includes an anode having opposite first and second surfaces; and an active metal ion conducting membrane that is disposed between the anode and the cathode, surrounds the anode, and has at least one folded portion and opposite first and second end portions which are disposed on the opposite first and second surfaces of the anode, respectively.

According to an aspect of another exemplary embodiment, an electrochemical cell module includes: a plurality of the electrochemical cells that are stacked upon one another; and at least one gas diffusion layer disposed between neighboring surfaces of each of the electrochemical cells.

According to an aspect of another exemplary embodiment, disclosed is a method of preparing an electrochemical cell, the method including: providing a cathode; disposing an active metal ion conducting membrane on a surface of the cathode; disposing an anode on a surface of the active metal ion conducting membrane; and folding the cathode and the active metal ion conducting membrane to form a first contact and a second contact between the active metal ion conducting membrane and at least one of a first spot on a surface of the anode, a second spot on the surface of the anode, and a surface region of the active metal ion conducting membrane that is not disposed on the anode to prepare the electrochemical cell.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1A:
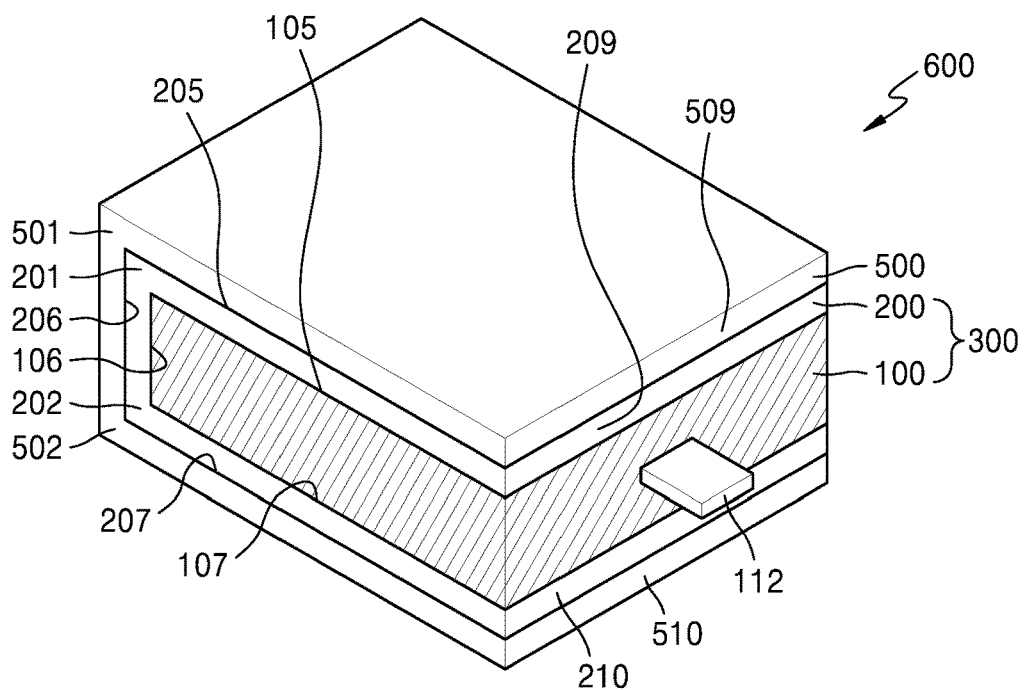
FIG. 1A is a schematic view illustrating a structure of an electrochemical cell according to an embodiment.

Reference will now be made in detail to exemplary embodiments of an electrochemical cell, an electrochemical cell module, and a method of preparing an electrochemical cell, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain various aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In a currently available metal-air battery, only one surface of the metal-air battery is externally connected for electrode reaction, e.g., in fluid communication with an outside of the battery so that air can transfer to and from the cathode of the battery, and the opposite surface is not available for electrode reaction. Accordingly, a stack of multiple metal-air batteries may have a limited supply of air thereto and consequentially a limited discharge capacity. In addition, since the metal anode of the metal-air battery is supported by a conductive support, the energy density of the metal-air battery may be limited by the volume and weight of the conductive support.

According to an aspect of the present disclosure, an electrochemical cell includes: an anode assembly having opposite surfaces; and a cathode having at least one folded portion and ionic continuity with the opposite surfaces of the anode assembly, wherein the anode assembly includes an anode and an active metal ion conducting membrane that is disposed between the anode and the cathode and has at least one folded portion.

As used herein, the term "ionic continuity" means that under an associated electric field and/or concentration gradient active metal ions are transportable between the cathode and the anode assembly and/or between the anode and the active metal ion conducting membrane. For example, active metal ions are transportable between the cathode and the active metal ion conducting membrane of the anode assembly. For example, active metal ions are transportable between the anode and the active metal ion conducting membrane.

As used herein, the term "physical continuity" or "contacting" means that mechanical force applied by the active metal ion conducting membrane is transportable or communicable to the anode. It also means that mechanical force applied by the anode is transportable or communicable to the active metal ion conducting membrane.

As used herein, the term "active metal" refers to a metal available as an electrode active material.

In some embodiments, in the electrochemical cell, active metal ions are transportable via the plurality of surfaces of the anode assembly due to a presence of one or a plurality of folded portions of the cathode, and thus the electrochemical cell may have improved capacity density compared to an electrochemical cell not having the folded portions and in which active metal ions are transportable only via a single surface of an anode assembly due to an absence of a folded portion of the cathode.

Referring to FIG. 1A, in an electrochemical cell 600 according to an embodiment, a cathode 500 is disposed on, e.g., surrounds, both opposite surfaces, i.e. a first surface and a second opposite surface which opposes the first surface, of an anode assembly 300.

Since the cathode 500 is disposed on or surrounds the opposite surfaces of the anode assembly 300 and has ionic continuity with the opposite surfaces of the anode assembly 300, an active metal ion may be transported between the cathode 500 and the anode assembly 300. In the electrochemical cell 600, the cathode 500 may have at least one folded portion 501 and maybe disposed on, e.g., surround, a surface 205 of the anode assembly 300 and a surface 206 adjacent to the surface 205. The anode assembly 300 may include an active metal ion conducting membrane 200 having opposite first and second surfaces 205 and 207, respectively, which correspond to opposite first and second surfaces of the anode assembly 300.

The cathode 500 may have first and second folded portions 501 and 502 that are folded in the same direction as the folding directions of first and second folded portions 201 and 202, respectively, of the active metal ion conducting membrane 200, which constitutes a part of the anode assembly 300.

In the electrochemical cell 600, the cathode 500 may have opposite first and second end portions 509 and 510, respectively, which may be disposed on the opposite first and second surfaces 205 and 207 of the anode assembly 300, respectively. In other words, the cathode 500 may be disposed on, e.g., surround, the first surface 205 of the anode assembly 300, the third surface 206 thereof which is adjacent to the first surface 205, and the second surface 207 thereof which is opposite to the first surface 205, with the opposite first and second surface end portions 509 and 510 being on the opposite first and second surfaces 205 and 207 of the anode assembly 300, respectively. The cathode 500 may be disposed on, e.g., surround, the anode assembly 300 in a U-like form, for example. The form they have any suitable shape, and may be rectilinear or curvilinear, and may be a "C" shape, an "M" shape, or a "W" shape, for example.

Figure 1B:
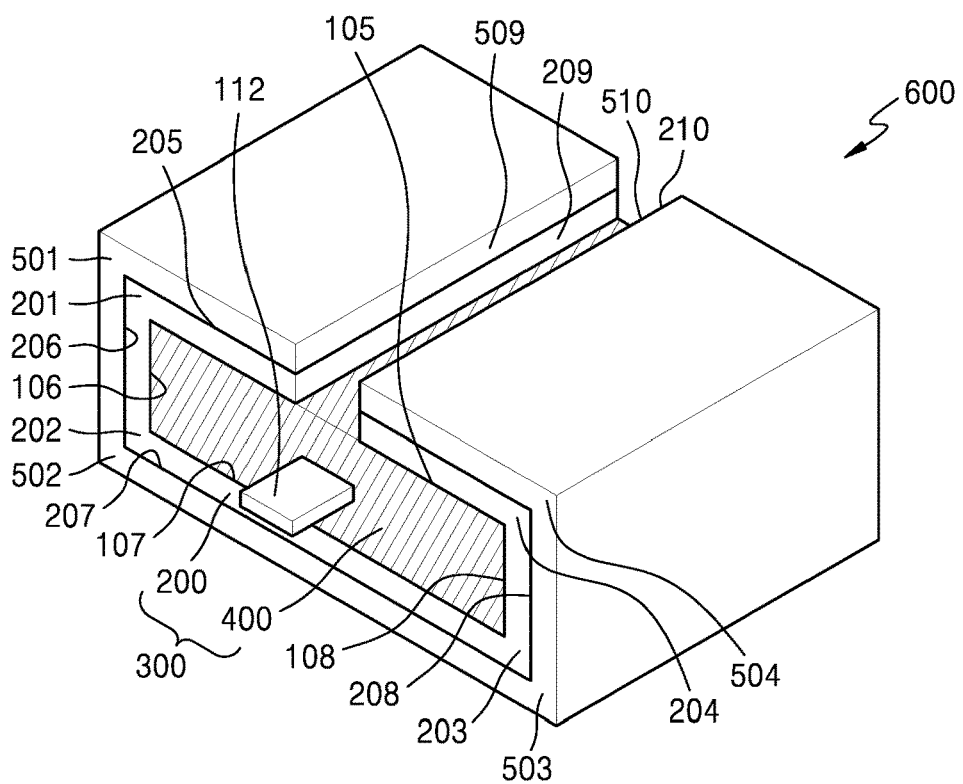
FIG. 1B is a schematic view illustrating a structure of an electrochemical cell according to an embodiment.

Referring to FIG. 1B, in an electrochemical cell 600 according to another embodiment, the cathode 500 may have opposite first and second end portions 509 and 510 that are both on the first surface 205 of the anode assembly 300.

In other words, the cathode 500 may surround the first surface 205 of the anode assembly 300, third and fourth surfaces 206 and 208 thereof adjacent to the first surface 205, and the second surface 207 thereof opposing the first surface 205 with the opposite first and second end portions 509 and 510 being disposed on the first surface 205 of the anode assembly 300. The opposite first and second end portions 509 and 510 of the cathode 500 may be on the same first surface 205 of the anode assembly 300, and may be in contact with or separated from each other.

In the electrochemical cell 600 of FIGS. 1A and 1B, an anode 100 of the anode assembly 300 may have opposite first and second surfaces 105 and 107, and the active metal ion conducting membrane 200 may have ionic continuity with the opposite first and second surfaces 105 and 107 of the anode 100.

The anode 100 may have a two-dimensional structure. For example, the anode 100 may be in sheet form without a folded portion. The two-dimensional structure of the anode 100 may be any suitable structure with a length and a width defining the area of the anode 100 and that are much greater than the thickness of the anode 100. A ratio of the thickness of the anode 100 to one of the length and width defining the area of the anode 100 may be about 1:10 or greater, about 1:100 or greater, or about 1:1000 or greater, and may be about 1:1 to 1:2000, or 1:10 to 1:1000, for example.

Figure 2A:
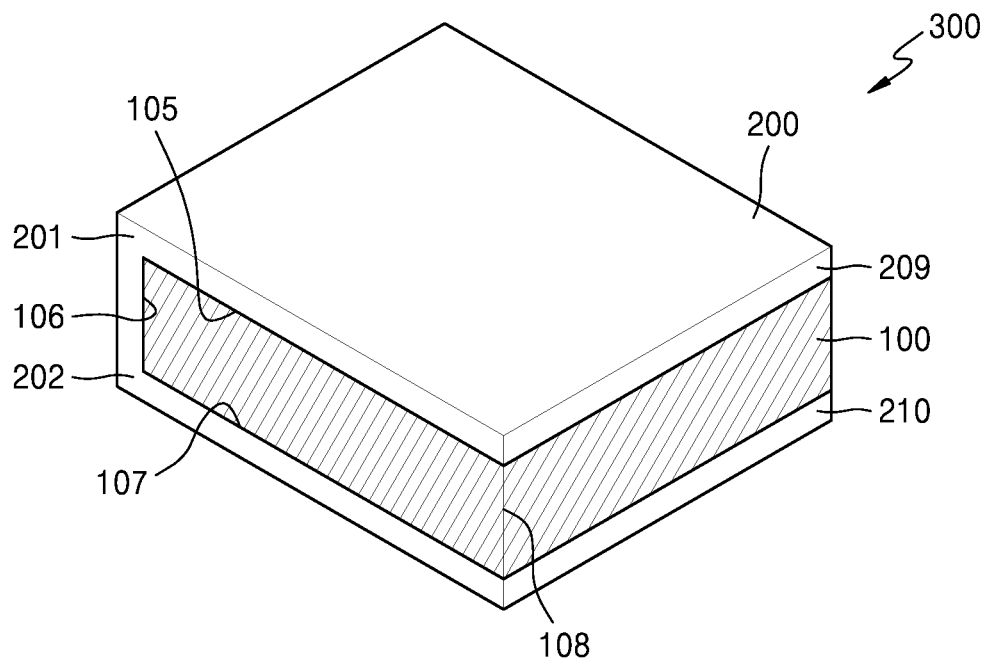
FIG. 2A is a schematic view illustrating a structure of an anode assembly according to an embodiment.

Referring to FIG. 2A, in an anode assembly 300 according to an embodiment, an active metal ion conducting membrane 200 may be disposed on, e.g., surround, the opposite first and second surfaces 105 and 107 of the anode 100.

Since the active metal ion conducting membrane 200 may contact and surround the opposite first and second surfaces 105 and 107 of the anode 100, the active metal ion conducting membrane 200 may have ionic continuity with the opposite first and second surfaces 105 and 107 of the anode 100. The active metal ion conducting membrane 200 of the anode assembly 300 may have a folded portion 201 and surround the first surface 105 of the anode 100 and a third surface 106 thereof which is adjacent to the first surface 105 of the anode 100.

In the anode assembly 300 of FIG. 2A, opposite first and second end portions 209 and 210 of the active metal ion conducting membrane 200 may be on the opposite first and second surfaces 105 and 107, respectively, of the anode 100. In other words, the active metal ion conducting membrane 200 may be disposed on, e.g., surround, the first surface 105 of the anode 100, a third surface 106 thereof adjacent to the surface 105, and a second surface 107 thereof opposing to the first surface 105 of the anode 100, with the opposite first and second end portions 209 and 210 being, respectively, disposed on the opposite first and second surfaces 105 and 107 of the anode 100. The active metal ion conducting membrane 200 may be disposed on, e.g., surround, the anode 100 in a U-like form, and may be a "C" shape, an "M" shape, or a "W" shape, for example.

Figure 2B:
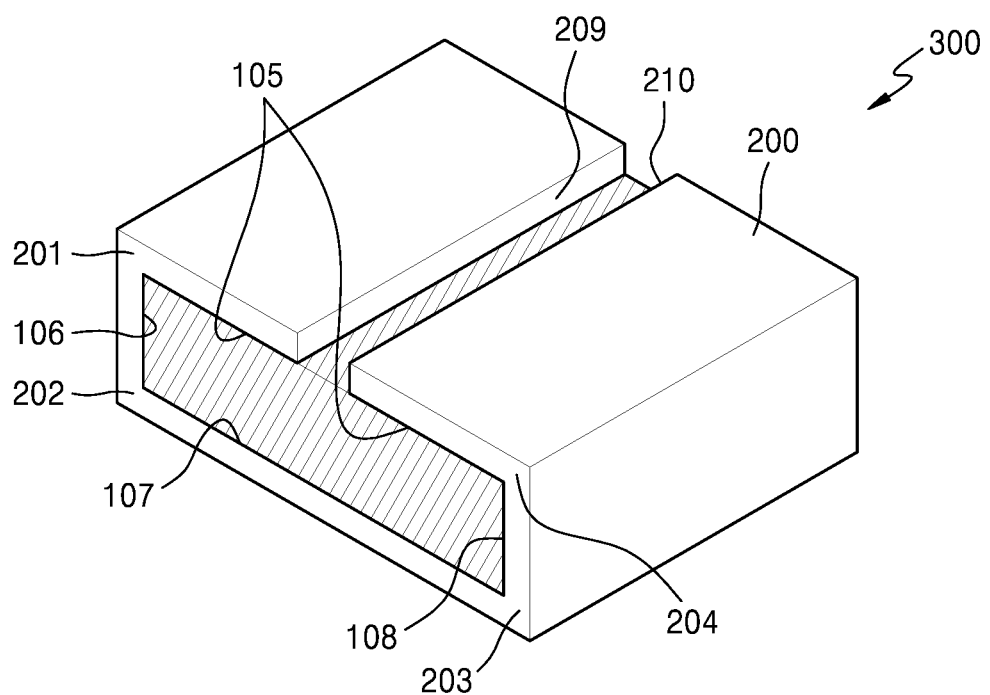
FIG. 2B is a schematic view illustrating a structure of an anode assembly according to an embodiment.

Referring to FIG. 2B, in an anode assembly 300 according to another embodiment, the opposite first and second end portions 209 and 210 of an active metal ion conducting membrane 200 may both be on the first surface 105 of the anode 100. In other words, the active metal ion conducting membrane first 200 may partially surround the surface 105 of the anode 100, third and fourth surfaces 106 and 108 thereof adjacent to the first surface 105, and the second surface 107 thereof opposing the first surface 105, with the opposite first and second end portions 209 and 210 being disposed on the same first surface 105 of the anode 100. The opposite first and second end portions 209 and 210 of the active metal ion conducting membrane 200 on the same first surface 105 of the anode 100 may be in contact with or separated from each other.

Figure 3A:
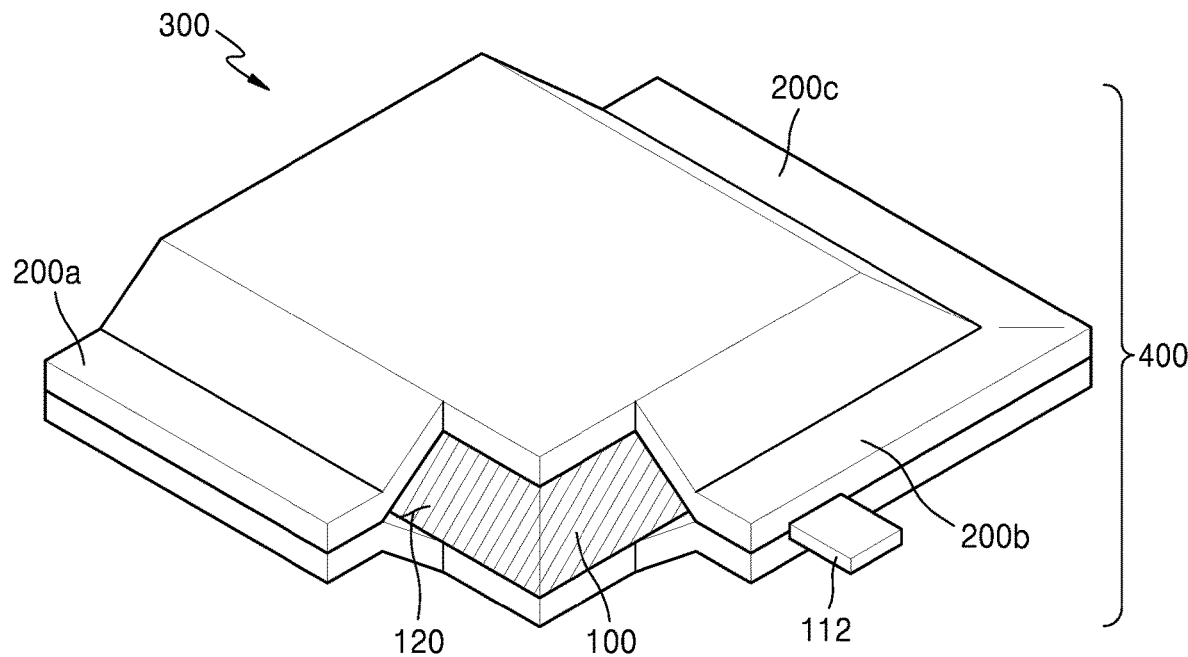
FIG. 3A is a schematic view illustrating a structures of an anode assembly according to an embodiment.

Referring to FIG. 3A, in an anode assembly 300 according to another embodiment, an active metal ion conducting membrane 200 of the anode assembly 300 may form a housing 400 that is substantially impermeable and has an internal region which is hermetically sealed by first, second, and third edge portions 200a, 200b, and 200c, respectively, of the active metal ion conducting membrane 200 from an external region, e.g., an outside air, and isolating an anode 100 from the cathode 500. Although the anode 100 is isolated in the housing 400, transportation of active metal ions into and out of the housing 400 is possible.

The housing 400 that is impermeable may include a space 120 between the active metal ion conducting membrane 200 and the anode 100. The space 120 may be large enough for accommodating a volumetric change in the anode 100 that accompanies the charging and discharging of an electrochemical cell. Further, even without the space 120, the housing 400 may accommodate the volumetric change of the anode 100 that accompanies the charging and discharging of an electrochemical cell.

The housing 400 that is impermeable may block a flow of external liquid and/or gas components such as moisture and oxygen, except for active metal ions, from the external environment to suppress side reactions between such external components and the active metal of the anode 100, and thus may improve the lifetime of an electrochemical cell including the housing 400 that is impermeable. When a volatile component is present in the housing 400 that is impermeable and encloses the anode 100, the housing 400 may prevent volatilization and thus loss of the volatile component. Since the housing 400 that is impermeable is formed only with the active metal ion conducting membrane 200, the anode assembly 300 may have a simple structure.

Figure 4A:
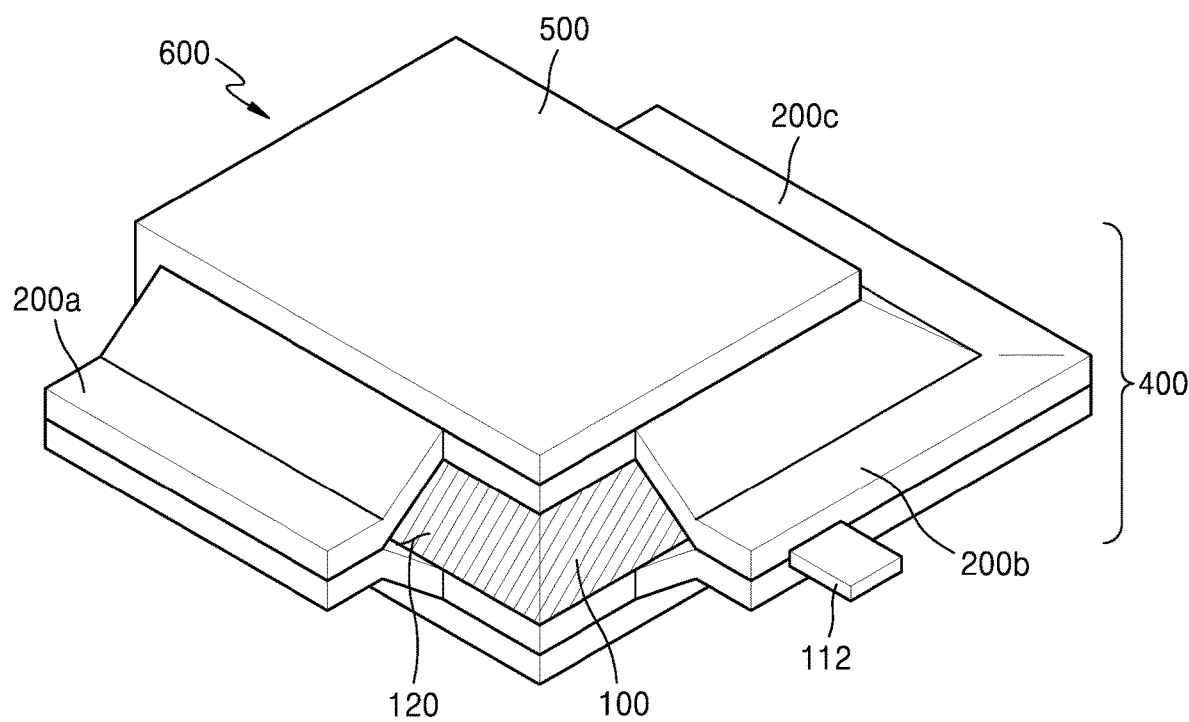
FIG. 4A is a schematic view illustrating a structure of an electrochemical cell according to an embodiment.

Referring to FIG. 4A, in an electrochemical cell 600 according to an embodiment, a cathode 500 may surround opposite surfaces of the housing 400 that is substantially impermeable.

Figure 3B:
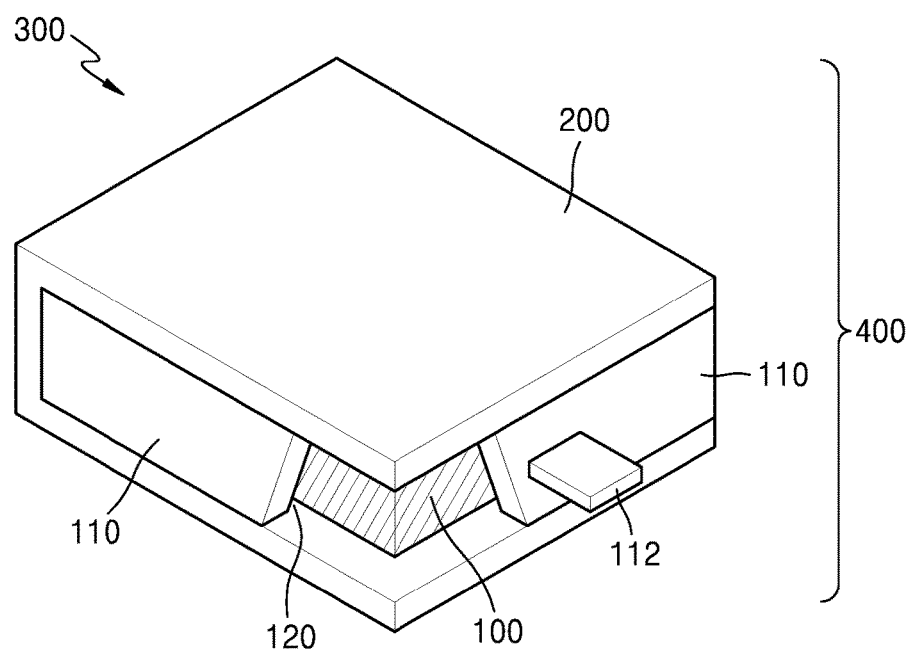
FIG. 3B is a schematic view illustrating a structure of an anode assembly according to an embodiment.
Figure 3C:
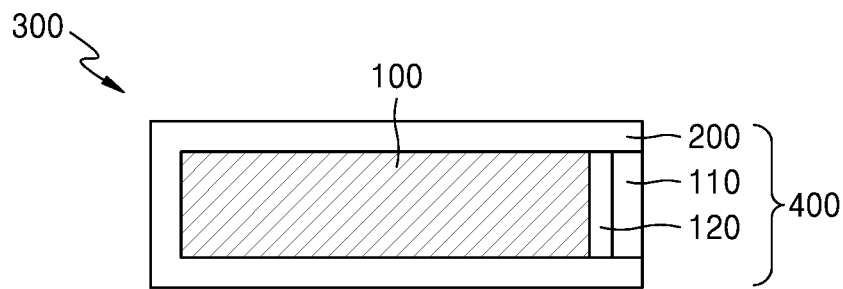
FIG. 3C is a sectional view of the anode assembly of FIG. 3B.

Referring to FIGS. 3B and 3C, an anode assembly 300 according to another embodiment may further include a seal structure 110 that interfaces with the active metal ion conducting membrane 200 to enclose the anode 100. The seal structure 110 may form the housing 400 that is substantially impermeable and includes an internal region that is hermetically sealed from an external region, while isolating the anode 100 from the cathode 500.

Although the anode 100 is isolated in the housing 400 including the seal structure 110, transportation of active metal ions into and out of the housing 400 is possible.

The housing 400 that is impermeable, including the seal structure 110, may include a space 120. Further, the housing 400 of FIG. 3C may accommodate a volumetric change in the anode 100 that accompanies the charging and discharging of an electrochemical cell, without the space 120.

Figure 4B:
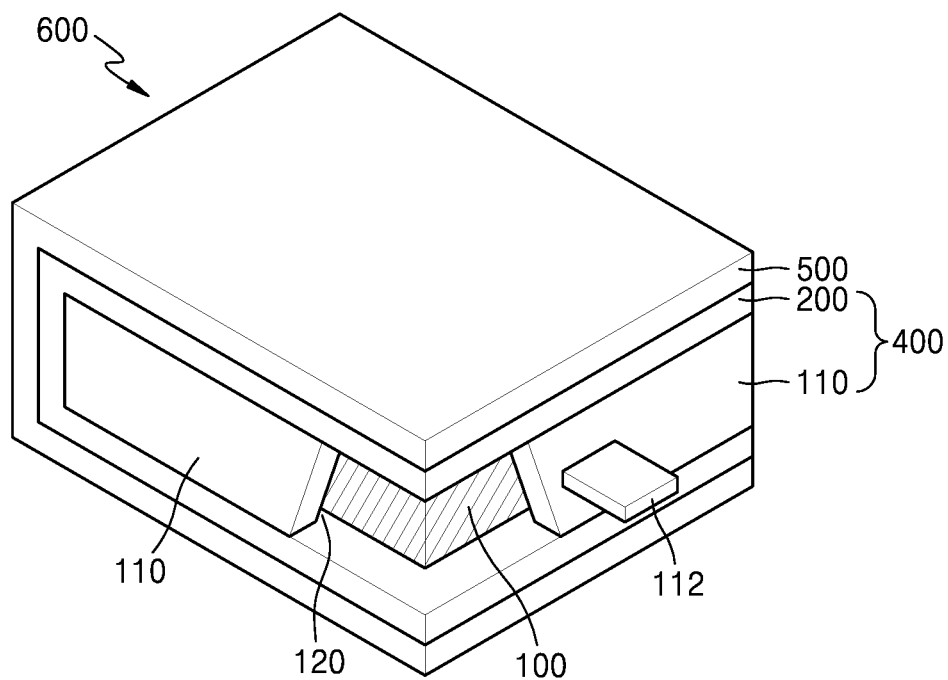
FIG. 4B is a schematic view illustrating a structure of an electrochemical cell according to an embodiment.

Referring to FIG. 4B, in an electrochemical cell 600 according to another embodiment, a cathode 500 may surround opposite surfaces of the housing 400 that is substantially impermeable.

The seal structure 110 may be substantially impermeable to external liquid and/or gas components such as moisture and oxygen. The seal structure 110 may include a single material with provide suitable chemical stability, flexibility, and substantial impermeability. Alternatively, a combination of a plurality of materials may be used to provide the seal structure 110.

The seal structure 110 may include any suitable polymer having suitable chemical stability, chemical stability, flexibility, and the ability to block gas and moisture.

For example, the polymer with the ability to block gas and moisture may be silicone, polyethylene vinyl alcohol (EVOH), polyvinylidene chloride (PVDC), high-density polyethylene (HDPE), polypropylene (PP), polyvinyl chloride (PVC), polytetrafluoroethylene (PTFE), or polyvinylidene fluoride (PVDF), but is not limited thereto. The polymer with the ability to block gas and moisture may be any suitable polymer which has suitable gas and moisture blocking properties and is available for a seal structure in the art.

For example, the polymer with the ability to block gas and moisture that is used for the seal structure 110 may be the same polymer as used in an organic film including a plurality of through holes that will be described below in conjunction with a composite membrane.

The seal structure 110 may be formed by applying a sealant including a polymer with the ability to block gas and moisture on the surface of the anode 100 and/or a space between the active metal ion conducting membrane 200 contacting the anode 100.

The seal structure 110 may be a multi-layer laminate composite seal structure to have improved barrier characteristics. For example, the multi-layer laminate composite seal structure may include a substantially impermeable intermediate barrier layer, a chemically resistant top layer, and a chemically resistant bottom layer.

The intermediate barrier layer may comprise a metal foil. A metal of the metal foil may be aluminum, tin, copper, stainless steel, or the like, but is not limited thereto. The metal of the metal foil may be any suitable metal which is available to provide a substantially impermeable metal foil. The metal foil may have a thickness of about 1 micrometer (μm) to about 500 μm, and the thickness thereof may vary depending on uses. For example, the metal foil may have a thickness of about 10 μm to about 90 μm. The metal foil may comprise aluminum or copper, for example. In some embodiments, the multi-layer laminate composite seal structure may include, in addition to a metal foil, thin layers of at least one selected from a glass, a polymer, and a ceramic. For example, the multi-layer laminate composite seal structure may have a three-layer structure including a first polymer layer, a metal foil layer, and a second polymer layer. The multi-layer laminate composite seal structure may have a thickness of about 10 μm to about 500 μm.

Materials for the top layer and the bottom layer may include polymers such as polyethylene (PE), polypropylene (PP), polytetrafluoroethylene (PTFE), and polyisobutylene (PB), but are not limited thereto. For example, any suitable polymer that provide suitable chemical resistance and may form a stable laminate composite layer with a metal foil may be used.

The multi-layer laminate composite seal structure may be bound to the active metal ion conducting membrane 200 by using a sealant. For example, the sealant may be a polymer with the ability to block moisture and gas and adhesiveness, such as silicone, as described above.

Referring to FIG. 3A, the active metal ion conducting membrane 200 may be compliant with a thickness change in the anode 100 while maintaining physical continuity with the anode 100. Therefore, the active metal ion conducting membrane 200 may easily accommodate a volumetric change in the anode 100 that accompanies the charging and discharging of a lithium-air battery and thus maintain the physical continuity with the anode 100.

Referring to FIGS. 3B and 3C, the seal structure 110 may be compliant with a thickness change in the anode 100 while maintaining physical continuity with the anode 100. Therefore, the seal structure 110 may accommodate a volumetric change in the anode 100 during charging and discharging of an electrochemical cell and thus maintain the physical continuity with the anode 100.

Thus, the housing 400 that is impermeable, which may include the seal structure 110 or not, may maintain the physical continuity with the anode 100 while accommodating a volumetric change in the anode 100 during charge and discharge of an electrochemical cell. The active metal ion conducting membrane 200 of the anode assembly 300 may be an active metal ion conducting solid membrane. The active metal ion conducting solid membrane 200 may be substantially impermeable, have active metal ion conducting characteristics, and be chemically compatible with an external environment including oxygen or moisture or with a cathode environment.

The active metal ion conducting membrane 200 may have a thickness of about 10 μm or greater. For example, the active metal ion conducting membrane 200 may have a thickness of about 10 μm to about 20 μm, about 20 μm to about 60 μm, about 60 μm to about 100 μm, about 100 μm to about 200 μm, about 200 μm to about 600 μm, about 600 μm to about 1000 μm, about 1 mm to about 6 mm, about 6 mm to about 10 mm, about 10 mm to about 60 mm, about 60 mm to about 100 mm, or about 100 mm to about 600 mm.

The active metal ion conducting membrane 200 of the anode assembly 300 may be a gas and moisture barrier membrane. Since a gas such as oxygen and moisture may be blocked by the active metal ion conducting membrane 200, the anode 100 enclosed in the housing 400 that is impermeable and includes the active metal ion conducting membrane 200 may be protected from deterioration by oxygen or moisture.

The active metal ion conducting membrane 200 of the anode assembly 300 may be a composite membrane including at least two components.

The composite membrane may have a thickness of about 10 μm or greater. For example, the composite membrane may have a thickness of about 10 μm to about 100 μm, and in some embodiments, about 100 μm to about 600 μm.

For example, the active metal ion conducting membrane 200 may be a composite membrane including an organic film having a plurality of pores and an ion-conductive polymer electrolyte formed in the plurality of pores of the organic layer.

The organic film including a plurality of pores may be a porous organic film in which a plurality of pores are randomly formed. The organic film including a plurality of pores may be a flexible polymer-based separator.

For example, the porous organic film may be a polymer nonwoven fabric such as polypropylene-based nonwoven fabric, polyimide-based nonwoven fabric, or polyphenylene sulfide-based nonwoven fabric, or a porous film of an olefin-based resin such as polyethylene, polypropylene, polybutene, or polyvinyl chloride, but is not limited thereto. Any suitable material available for a porous organic layer in the art may be used. For example, the porous organic layer may include a polymer that is the same as the polymer for an organic layer having a plurality of through holes, as is further disclosed below.

The ion-conductive polymer electrolyte may be disposed in the pores of the porous organic layer. For example, the organic layer including a plurality of pores may be impregnated with the ion-conductive polymer electrolyte.

An ion-conductive polymer electrolyte may be impregnated into a flow path formed by interconnection of the plurality of randomly formed pores in the organic film so as to be exposed to opposite surfaces of the organic layer to thereby provide a migration path of active metal ions.

The ion-conductive polymer electrolyte may include a polymer, for example, at least one selected from polyethylene oxide (PEO), polyvinyl alcohol (PVA), polyvinylpyrrolidone (PVP), and polysulfone. However, the polymer for the ion-conductive polymer electrolyte is not limited thereto. Any suitable polymer available for an ion-conductive polymer electrolyte in the art may be used.

The ion-conductive polymer electrolyte may comprise polyethylene oxide (PEO) doped with a lithium salt. Non-limiting examples of the lithium salt include at least one selected from $LiN(SO_2CF_2CF_3)_2$, LiTFSi, LiFSi, $LiBF_4$, $LiPF_6$, $LiSbF_6$, $LiAsF_6$, $LiClO_4$, $LiCF_3SO_3$, $LiN(SO_2F)_2$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, and $LiAlCl_4$.

For example, the active metal ion conducting membrane 200 may be a composite membrane including an organic film having a plurality of through holes and an ion-conductive inorganic particle disposed in the plurality of through holes of the organic layer. The term "through hole" refers to a hole that is formed to pass through opposite surfaces of the organic layer.

The ion-conductive inorganic particle in the through holes is exposed at both of the opposite surfaces of the organic layer, and thus provides a migration path of active metal ions.

The active metal ion conducting membrane 200 may include an ion-conductive domain and a non-ion-conductive domain. The ion-conductive domain and the non-ion-conductive domain may be disposed in a membrane thickness direction (e.g., a Y-axis direction) to contact each other, thus form a bicontinuous structure. The ion-conductive domain may include an ion-conductive inorganic particle, while the non-ion-conductive domain may include a polymer. The ion-conductive inorganic particle may have a single-particle state without a grain boundary. The active metal ion conducting membrane 200 including ion-conductive inorganic particles exposed at the opposite surfaces of the organic layer may be a composite membrane having ionic conductivity with improved flexibility and improved mechanical strength, and thus may be processable as desired.

The organic film having a plurality of pores or having a plurality of through holes may include a polymer with the ability to block gas and moisture.

Since the organic film of the active metal ion conducting membrane 200 blocks gas and moisture, the active metal ion conducting membrane 200 may protect the active metal anode 100. Accordingly, the active metal ion conducting membrane 200 may serve as a protective membrane.

For example, the polymer with the ability to block gas and moisture may be at least one selected from polyvinyl alcohol, polyimide, epoxy resin, an acrylic resin, poly 2-vinylpyridine, polytetrafluoroethylene, a tetrafluoroethylene-hexafluoropropylene copolymer, polychlorotrifluoroethylene, a perfluoroalkoxy copolymer, fluorinated cyclic ether, polyethylene oxide diacrylate, polyethylene oxide dimethacrylate, polypropylene oxide diacrylate, polypropylene oxide dimethacrylate, polymethylene oxide diacrylate, polymethylene oxide dimethacrylate, a poly(C1-

C6alkyldiol) diacrylate, a poly(C1-C6alkyldiol) dimethacrylate, polydivinylbenzene, polyether, polycarbonate, polyamide, polyester, polyvinyl chloride, polyimide, polycarboxylic acid, polysulfonic acid, polyvinyl alcohol, polysulfone, polystyrene, polyethylene, polypropylene, poly (p-phenylene), polyacetylene, poly(p-phenylene vinylene), polyaniline, polypyrrole, polythiophene, poly(2,5-ethylene vinylene), polyacene, poly(naphthalene-2,6-diyl), polyethylene oxide, polypropylene oxide, polyvinylidene fluoride, vinylidene fluoride-hexafluoropropylene copolymer, poly (vinyl acetate), poly(vinyl butyral-co-vinyl alcohol-co-vinyl acetate), poly(methyl methacrylate-co-ethyl acrylate), polyacrylonitrile, polyvinyl chloride-co-vinyl acetate, poly(1-vinyl pyrrolidone-co-vinyl acetate), polyvinylpyrrolidone, polyacrylate, polymethacrylate, polyurethane, polyvinyl ether, an acrylonitrile-butadiene rubber, a styrene-butadiene rubber, an acrylonitrile-butadiene-styrene rubber, a sulfonated styrene/ethylene-butylene triblock copolymer, polyvinyl alcohol, polyamide, an epoxy resin, an acryl-based resin and a polymer derived from at least one acrylate monomer selected from ethoxylated neopentyl glycol diacrylate, ethoxylated bisphenol A diacrylate, ethoxylated aliphatic urethane acrylate, an ethoxylated C1-C6 alkylphenol acrylate, and a C1-C6 alkyl acrylate. However, examples of the polymer with the ability to block gas and moisture are not limited thereto, and may include any suitable polymers which provide gas and moisture barrier characteristics.

The ion-conductive inorganic particle may be at least one selected from a glassy or amorphous metal ion conductor, a ceramic active metal ion conductor, and a glass ceramic active metal ion conductor. The ion-conductive inorganic particle may also block gas and moisture.

For example, the ion-conductive inorganic particle may include at least one selected from $BaTiO_3$, $Pb(Zr,Ti)O_3$ (PZT), $Pb(Zr_aTi_{1-a})O_3$ wherein $0 \le a \le 1$, $Pb_{1-x}La_xZr_{1-y}Ti_yO_3$ (PLZT) (wherein $0 \le x<1$ and $0 \le y<1$), e.g., $Pb(Zr_aTi_{1-a})O_3$ wherein $0 \le a \le 1$, $Pb(Mg_{3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$, wherein $0<x<2$ and $0<y<3$), lithium aluminum titanium phosphate ($Li_xAl_yTi_z(PO_4)_3$ wherein $0<x<2$, $0<y<1$, and $0<z<3$), $Li_{1+x+y}(Al, Ga)_x(Ti, Ge)_{2-x}Si_yP_{3-y}O_{12}$ (where $0 \le x \le 1$ and $0 \le y \le 1$), e.g., $Li_{1+x+y}(Al_bGa_{1-b})_x(Ti_cGe_{1-c})_{2-x}Si_yP_{3-y}O_{12}$ wherein $0 \le x \le 1$, $0 \le y \le 1$, $0 \le b \le 1$, and $0 \le c \le 1$, lithium lanthanum titanate ($Li_xLa_yTiO_3$, where $0<x<2$ and $0<y<3$), lithium germanium thiophosphate, $Li_xGe_yP_zS_w$, wherein $0<x<4$, $0<y<1$, $0<z<1$, and $0<w<5$, lithium nitride-based glass, $Li_xN_y$, where $0<x<4$ and $0<y<2$, a $SiS_2$-based glass, $Li_xSi_yS_z$, wherein $0<x<3$, $0<y<2$, and $0<z<4$, a $P_2S_5$-based glass, $Li_xP_yS_z$, wherein $0<x<3$, $0<y<3$, and $0<z<7$, $Li_2O$, LiF, LiOH, $Li_2CO_3$, $LiAlO_2$, a $Li_2O$—$Al_2O_3$—$SiO_2$—$P_2O_5$—$TiO_2$—$GeO_2$-based ceramic, and a Garnet-based ceramics, e.g., $Li_{3+x}La_3M_2O_{12}$, wherein M is Te, Nb, or Zr. However, examples of the ion-conductive inorganic particle are not limited thereto, and may include any suitable ion-conductive inorganic particle available in the art.

In an embodiment, the ion-conductive inorganic particle has no grain boundary, as is further described above. Accordingly, a composite membrane including the ion-conductive inorganic particle may have a low-resistance conduction path of active metal ions. This may facilitate conduction and migration of active metal ions and consequentially, significantly improve the conductivity of active metal ions and the transport rate of lithium ions. The composite membrane may have improved flexibility and improved mechanical strength, compared to a membrane including only inorganic material. The composite membrane may be foldable.

The fact that the ion-conductive inorganic particle is in a single-particle state without a grain boundary may be identified using scanning electron microscopy (SEM).

For example, the ion-conductive inorganic particle may have an average particle diameter of about 10 μm to about 300 μm, and in some embodiments, about 90 μm to about 125 μm. When the average particle diameter of the ion-conductive inorganic particle is within these ranges, it may be easy to form the active metal ion conducting membrane 200 as a composite membrane including ion-conductive inorganic particles having a single-particle state without a grain boundary, for example, by polishing.

The ion-conductive inorganic particle may have a uniform particle size, and may maintain the particle size uniform in the composite membrane. For example, the ion-conductive inorganic particle may have a D50 of about 110 μm to about 130 μm, a D90 of about 180 μm to about 200 μm, and a D10 of about 60 μm to about 80 μm. The terms "D50," "D10," and "D90" refer to a particle diameter of 50 volume %, 10 volume %, and 90 volume %, respectively, in a cumulative distribution curve of particle sizes.

The active metal ion conducting membrane 200 of the anode assembly 300 may have a single-layer structure or a multi-layer structure.

When the active metal ion conducting membrane 200 is a composite membrane having a single-layer structure, the composite membrane may include a separator having a plurality of pores and an ion-conductive polymer electrolyte filling, i.e. formed in, the pores of the separator, or may include an organic film having a plurality of through holes and an ion-conductive inorganic particle in the through holes of the organic layer. These composite membranes may be prepared at a lower cost than a ceramic membrane. An electrochemical cell with a larger area, a thin film design, and a less weight may also be manufactured using such a composite membrane through a convenient manufacturing process. An electrochemical cell with improved lifetime may be manufactured using such a composite membrane. For example, the composite membrane having a single-layer structure may have a thickness of about 1 μm to about 50 μm, about 50 μm to about 100 μm, or about 100 μm to about 300 μm.

Figure 3D:
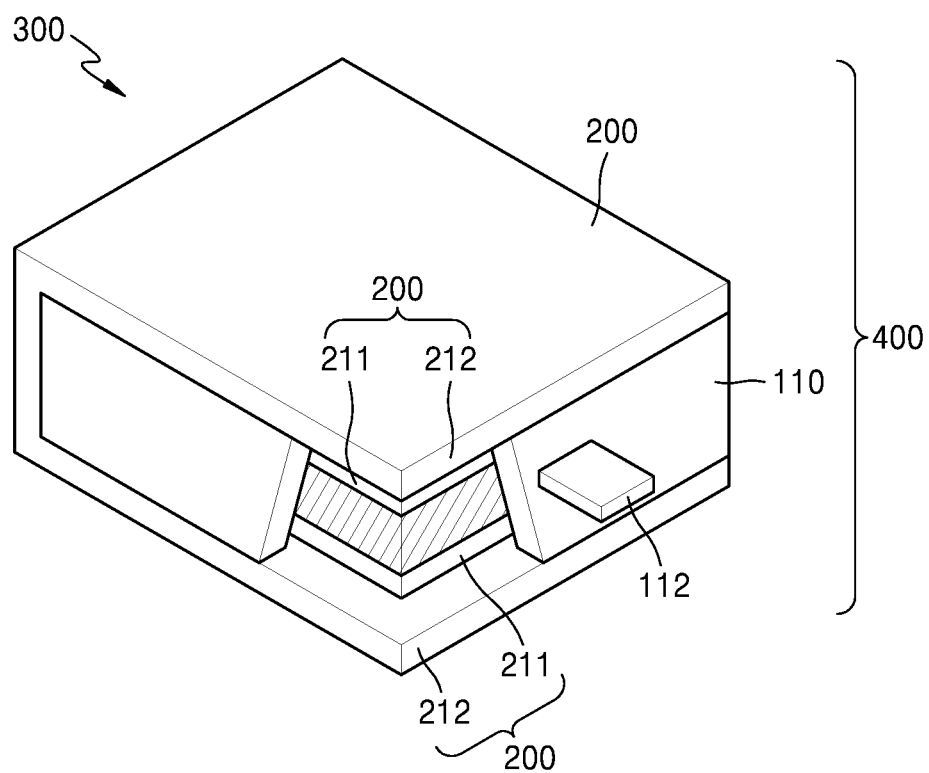
FIG. 3D is a schematic view illustrating a structure of an anode assembly according to an embodiment.
Figure 3E:
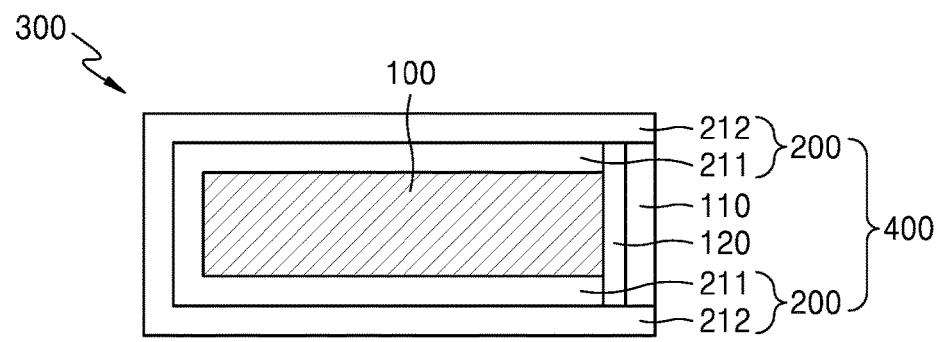
FIG. 3E is a sectional view of the anode assembly of FIG. 3D.

Referring to FIGS. 3D and 3E, in an anode assembly 300 according to another embodiment, when the active metal ion conducting membrane 200 comprises a composite membrane having a multi-layer structure, the active metal ion conducting membrane 200 may have a multi-layer structure in which a composite layer 212 with the ability to block gas and moisture and a polymer electrolyte membrane 211 are stacked upon one another. The further inclusion of the polymer electrolyte membrane 211 that is chemically compatible with both an anode environment and the composite layer 212 between the anode 100 as an active metal and the composite layer 212 may improve the stabilities of the active metal anode 100 and the composite layer 212. The composite layer 212 may substantially serve as a protective membrane for the anode 100.

The polymer electrolyte membrane 211 disposed between the composite layer 212 and the anode 100 may have a thickness of about 1 μm or greater. For example, the polymer electrolyte membrane 211 may have a thickness of about 1 μm to about 50 μm, about 50 μm to about 100 μm, or about 100 μm to about 300 μm. The polymer electrolyte membrane 211 may be a membrane including a polymer electrolyte available for the ion-conductive polymer electrolyte, as described above. For example, the polymer electrolyte membrane 211 may include a polyethylene oxide doped with a lithium salt. Examples of the doped lithium salt may be the same as listed above in conjunction with the ion-conductive polymer electrolyte.

Although not illustrated in FIGS. 3D and 3E, a porous membrane may be further disposed between the composite layer 212 and the polymer electrolyte membrane 211, or between the polymer electrolyte membrane 211 and the active metal anode 100.

The porous membrane may be any suitable membrane including pores and having suitable mechanical and heat-resistance characteristics. Examples of the porous membrane are sheets or nonwoven fabric comprising an olefin-based polymer, glass fiber, or polyethylene having suitable chemical resistance and hydrophobic characteristics. Examples of the olefin-based polymer include at least one selected from polyethylene and polypropylene. For example, the porous membrane may be a mixed multiple layer, such as a 2-layered polyethylene/polypropylene separator, a 3-layered polyethylene/polypropylene/polyethylene separator, or a 3-layered polypropylene/polyethylene/polypropylene separator.

For example, the porous membrane may comprise a polyethylene membrane or a polypropylene membrane. The porous membrane may have a pore diameter of about 0.01 µm to about 10 µm, and a thickness of about 10 µm or greater. For example, the porous membrane may have a thickness of about 10 µm to about 100 µm, and in some embodiments, about 100 µm to about 300 µm. For example, the porous membrane may have a thickness of about 10 µm to about 50 µm.

The porous membrane may include an electrolyte solution including a lithium salt and an organic solvent. The porous membrane including an electrolyte solution may serve as an electrolyte membrane. The porous membrane may also serve as a separator.

The amount of the lithium salt may be adjusted to be about 0.01 molar (M) to about 5 M, for example, about 0.2 M to about 2 M. When the amount of the lithium salt is within these ranges, the composite membrane may have suitable conductivity.

The lithium salt may be dissolved in an organic solvent to serve as a source of lithium ions. For example, the lithium salt may be at least one selected from $LiPF_6$, LiTFSi, LiFSi, $LiBF_4$, $LiSbF_6$, $LiAsF_6$, $LiN(SO_2F)_2$, $LiN(SO_2C_2F_5)_2$, $LiN(SO_2CF_3)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where $3 \leq x \leq 20$, and $3 \leq y \leq 20$), LiF, LiBr, LiCl, LiOH, LiI, and $LiB(C_2O_4)_2$ (lithium bis(oxalato) borate; LiBOB).

The electrolyte solution in the porous membrane may further include a metal salt, for example, at least one selected from $AlCl_3$, $MgCl_2$, NaCl, KCl, NaBr, KBr, and $CaCl_2$, in addition to a lithium salt as described above.

For example, the organic solvent of the electrolyte solution may be an aprotic solvent.

Non-limiting examples of the aprotic solvent include at least one selected from a carbonate-based solvent, an ester-based solvent, an ether-based solvent, a ketone-based solvent, and an amine-based solvent.

Examples of available carbonate-based solvents include at least one selected from dimethyl carbonate (DMC), diethyl carbonate (DEC), ethyl methyl carbonate (EMC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC).

Examples of available ester-based solvents include at least one selected from methyl acetate, ethyl acetate, n-propyl acetate, dimethyl acetate, methyl propionate, ethyl propionate, γ-butyrolactone, decanolide, valerolactone, mevalonolactone, and caprolactone.

Examples of available ether-based solvents include at least one selected from dibutyl ether, tetraglyme, diglyme, dimethoxyethane, 2-methyl tetrahydrofuran, and tetrahydrofuran. An example of a ketone-based solvent includes cyclohexanone.

Examples of available amine-based solvents are triethylamine and triphenylamine. An example of an available phosphine-based solvent includes triethylphosphine. Examples of the aprotic solvents are not limited to the above-listed solvents. Any suitable aprotic solvents available in the art may be used Examples of the aprotic solvent include nitriles such as nitriles of the formula R—CN (wherein R is a linear, branched, or cyclic C2-C30 hydrocarbon group that may include a double bond, an aromatic ring, or an ether bond); and amines such as dimethylformamide; dioxolanes such as 1,3-dioxolane; and sulfolanes.

The above-listed aprotic solvents may be used alone or in a combination of at least one thereof. In the latter, a ratio of the at least one aprotic solvents may be appropriately adjusted depending on a desired performance of the electrochemical cell.

In some embodiments, the porous membrane may include an ionic liquid. Examples of available ionic liquids are compounds comprising cations of linear or branched substituted ammonium, imidazolium, pyrrolidinium pyridinium, or piperidinium; and anions such as $PF_6^-$, $BF_4^-$, $CF_3SO_3^-$, $(CF_3SO_2)_2N^-$, $(C_2F_5SO_2)_2N^-$, $(C_2F_5SO_2)_2N^-$, or $(CN)_2N^-$.

Although not illustrated in FIGS. 1A and 1B, a solid electrolyte membrane may be further disclosed between the cathode 500 and the active metal ion conducting membrane 200. The additional solid electrolyte membrane may be a polymer electrolyte membrane or an inorganic electrolyte membrane. The additional solid electrolyte membrane may have a thickness of about 10 µm or greater. For example, the additional solid electrolyte membrane may have a thickness of about 10 µm to about 100 µm, and in some embodiments, about 100 µm to about 300 µm. The further inclusion of the solid electrolyte membrane that is chemically compatible with an external environment between the cathode 500 and the active metal ion conducting membrane 200 may improve a stability of the cathode 500 and the active metal ion conducting membrane 200.

Although not illustrated in FIGS. 1A and 1B, a porous membrane and/or an electrolyte solution may be further disposed between the cathode 500 and the active metal ion conducting membrane 200. The porous membrane and the electrolyte solution may be the same as the porous membrane and the electrolyte solution thereof, respectively, described above in conjunction with the embodiment of the anode assembly 300 of FIGS. 3D and 3E as being disposed between the composite layer 212 and the polymer electrolyte membrane 211 or between the polymer electrolyte membrane 211 and the active metal anode 100.

Figure 4C:
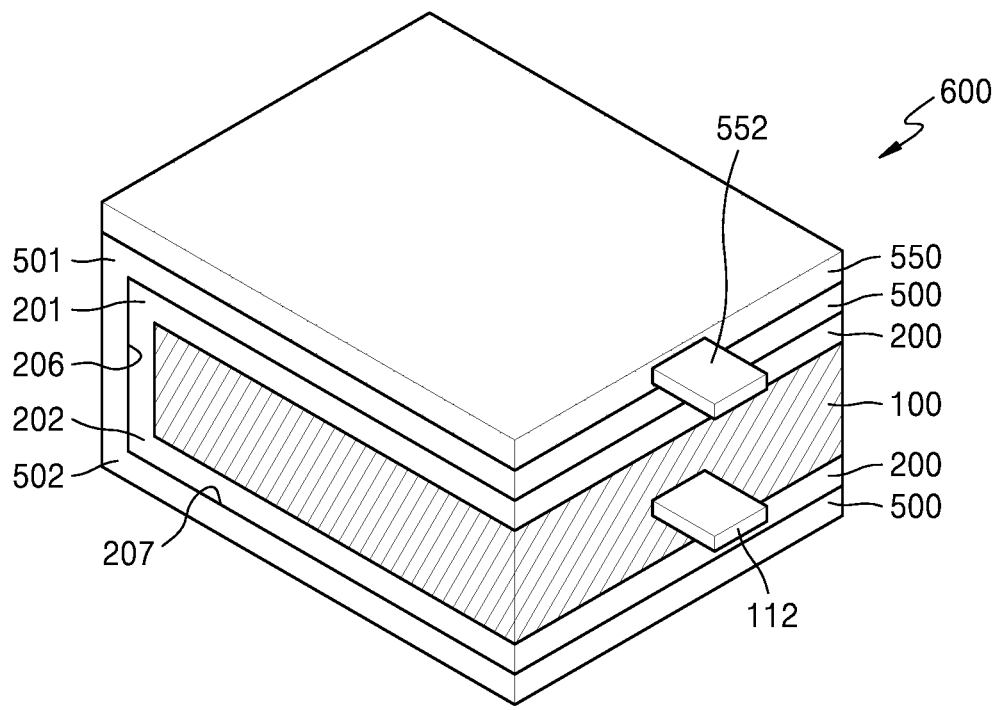
FIG. 4C is a schematic view illustrating a structure of an electrochemical cell according to an embodiment.

Referring to FIG. 4C, an electrochemical cell 600 according to an embodiment may further include a gas diffusion layer 550 disposed on a surface of the cathode 500. Air may be supplied into the electrochemical cell 600 by being diffused into the gas diffusion layer 550. The gas diffusion layer 550 may have an electrical conductivity. The gas diffusion layer 550 having conductivity may serve as a cathode current collector. A material for the gas diffusion layer 550 may be a porous carbonaceous material, a porous metal, or the like, and is not limited thereto. Any suitable materials available for a conductive gas diffusion layer in the art may be used. For example, the porous carbonaceous material may be a carbon fiber nonwoven fabric. A conductive carbonaceous gas diffusion layer may have a lower density than metal, and thus may further improve the energy density of an electrochemical cell.

Referring to FIG. 4C, the electrochemical cell 600 may further include a cathode current collector 552 disposed to contact the gas diffusion layer 550 and/or the cathode 500. The position of the cathode current collector 552 is not particularly limited, and may be selected depending on a shape of the electrochemical cell 600.

A porous structure in a matrix or mesh form may be used as the cathode current collector 552 to facilitate diffusion of oxygen. A porous metal plate made of, for example, stainless steel, nickel, or aluminum may also be used as the cathode current collector 552. Materials for the cathode current collector 552 are not particularly limited, and any appropriate materials for current collectors available in the art may be used. The cathode current collector 552 may be coated with an anti-oxidation metal or alloy film to prevent oxidation.

Referring to FIG. 4C, the electrochemical cell 600 may further include an anode current collector 112 disposed to contact the anode 100. The position of the anode current collector 112 is not particularly limited, and may be selected depending on a shape of the electrochemical cell 600 within a range where a short with the cathode current collector 552 does not occur.

A porous metal plate made of, for example, stainless steel, nickel, or aluminum may be used as the anode current collector 112. Materials for the anode current collector 112 are not particularly limited, and any appropriate materials for current collectors available in the art may be used.

In some embodiments, the electrochemical cell 600 according to any of the above-described embodiments may be a metal-air battery.

In a metal-air battery, the cathode 500 using oxygen as a cathode active material may include a conductive material. The conductive material may be porous. Accordingly, the cathode active material may be any material having porosity and conductivity, for example, a porous carbonaceous material. For example, the porous carbonaceous material may be at least one selected from carbon black, graphite, graphene, an activated carbon, and carbon fiber.

The cathode active material may comprise a metallic conductive material such as a metal fiber or metal mesh. The cathode active material may comprise a metallic powder, for example, at least one selected from copper, silver, nickel, and aluminum, and may be in any suitable form, such as in the form of a powder. The cathode active material may comprise an organic conductive material such as polyphenylene derivatives. The above-listed conductive materials may be used alone or in a combination thereof.

A catalyst for facilitating oxygen/reduction of oxygen may be added to the cathode 500 of the metal-air battery. Non-limiting examples of the catalyst include precious metal-based catalysts, such as platinum (Pt), gold (Au), silver (Ag), palladium (Pd), ruthenium (Ru), rhodium (Rh), and osmium (Os); oxide-based catalysts, such as manganese oxide, iron oxide, cobalt oxide, and nickel oxide; or organic metal-based catalysts, such as cobalt phthalocyanine. Any appropriate catalysts for oxidation and reduction of oxygen available in the art may be used.

The catalyst may be supported on a support. Non-limiting examples of the support include oxide, zeolite, clay mineral, and carbon. The oxide may include at least one oxide of alumina, silica, zirconium oxide, and titanium dioxide. The oxide may be an oxide that includes at least one metal selected from the group consisting of cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), and tungsten (W). Non-limiting examples of the carbon include carbon black, such as Ketjen black, acetylene black, channel black, and lamp black; graphite, such as natural graphite, artificial graphite, and expanded graphite; activated carbon; and carbon fibers. Any appropriate material available as a support in the art may be used.

The cathode 500 of the metal-air battery may further include a binder. The binder may include a thermoplastic resin or a thermocurable resin. Non-limiting examples of the binder include at least one selected from polyethylene, polypropylene, polytetrafluoroethylene (PTFE), polyvinylidene fluoride (PVDF), a styrene-butadiene rubber, a tetrafluoroethylene-perfluoroalkyl vinyl ether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a fluorovinylidene-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoro ethylene copolymer, and an ethylene-acrylic acid copolymer. Any appropriate binder available in the art may be used.

The cathode 500 of the metal-air battery may further include an ion-conductive polymer electrolyte. The ion-conductive polymer electrolyte may have a structure in which at least one polymer selected from polyethylene oxide (PEO), polyvinyl alcohol (PVA), polyvinylpyrrolidone (PVP), and polysulfone (polysulfone) is doped with lithium. For example, the ion-conductive polymer electrolyte may be polyethylene oxide doped with a lithium salt. The doped lithium salt may be the same as that used in the above-described ion-conductive polymer electrolyte.

The cathode 500 of the metal-air battery may be manufactured as follows. For example, a catalyst for oxidation/reduction of oxygen, a conductive material, and a binder may be mixed together, and then an appropriate solvent may be added thereto to prepare a cathode slurry. The cathode slurry may be coated and dried on a surface of a cathode current collector, optionally followed by press-molding to improve the density of the cathode 500, thereby manufacturing the cathode 500. Optionally, the cathode 500 of the metal-air battery may include a lithium oxide. Optionally, the cathode 500 may not include a catalyst for oxidation/reduction of oxygen.

The anode 100 of the metal-air battery may include an alkali metal (for example, lithium, sodium, or potassium), an alkaline earth metal (for example, calcium, magnesium, or barium), and/or a transition metal (for example, zinc), or an alloy thereof.

For example, the anode 100 of the metal-air battery may include one selected from lithium and a lithium alloy. The active metal anode 100 may be one selected from lithium and a lithium alloy including lithium as a main component.

As the anode 100 of the metal-air battery, a lithium metal thin film may also be used as it is. When a lithium metal thin film is used as the anode 100, the volume and weight of an anode current collector may be reduced, and the electrochemical cell may have improved energy density. In some embodiments, a lithium metal thin film as the anode 100 may be disposed on a conductive substrate that may also serve as the anode current collector. A lithium metal thin film as the anode 100 may be formed so as to be integrated with the anode current collector. The anode current collector may comprise at least one selected from stainless steel, copper, nickel, iron, and titanium, but is not limited thereto. Any suitable metallic substrates with suitable conductivity and available in the art may be used.

As the anode 100 of the metal-air battery, an alloy of a lithium metal and another anode active material may be used. The additional anode active material may be a metal that is alloyable with lithium. Non-limiting examples of the metal alloyable with lithium are at least one selected from Si, Sn, Al, Ge, Pb, Bi, Sb, a Si—Y' alloy (wherein Y' may be an alkali metal, an alkaline earth metal, a Group 13 element, a Group 14 element, a transition metal, and a rare-earth element, except for Si), and an Sn—Y" alloy (wherein Y" may be at least one selected from an alkali metal, an alkaline earth metal, a Group 13 element, a Group 14 element, a transition metal, and a rare-earth element, except for Sn). For example, the element Y" may be at least one selected from magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), and polonium (Po). For example, an alloy of a lithium metal and another anode active material may comprise at least one selected from a lithium aluminum alloy, a lithium silicon alloy, a lithium tin alloy, a lithium silver alloy, and a lithium lead alloy.

The anode 100 of the metal-air battery may have a thickness of about 10 μm or greater. The anode 100 may have a thickness of about 10 μm to about 20 μm, about 20 μm to about 60 μm, about 60 μm to about 100 μm, about 100 μm to about 200 μm, about 200 μm to about 600 μm, about 600 μm to about 1000 μm, about 1 mm to about 6 mm, about 6 mm to about 10 mm, about 10 mm to about 60 mm, about 60 mm to about 100 mm, or about 100 mm to about 600 mm.

In some embodiments, the electrochemical cell 600 may be a lithium secondary battery. The lithium secondary battery may be, for example, a lithium sulfur secondary battery or a lithium ion secondary battery.

A lithium sulfur secondary battery may use elemental sulfur ($S_8$), an elemental sulfur-containing compound, or a mixture thereof as a cathode active material for the cathode 500, wherein the elemental sulfur-containing compound may be at least one selected from $Li_2S_n$ (where n≥1), a solution of $Li_2S_n$ dissolved in catholyte (where n≥1), an organic sulfur compound, and a carbon-sulfur polymer (($C_2S_x)_n$, where x=2.5 to 50, and n≥2).

A lithium sulfur secondary battery may use a carbonaceous material that allows reversible intercalation/deintercalation of lithium ions, as an anode active material for the anode 100.

The carbonaceous material may comprise any suitable carbonaceous anode active material available for lithium sulfur secondary batteries in the art. Examples of the carbonaceous material include at least one selected from crystalline carbon and amorphous carbon. Non-limiting examples of materials that may reversibly form a lithium-containing compound by reversible reaction with lithium ions are tin oxide ($SnO_2$), titanium nitrate, and silicon (Si). For example, an anode active material available for lithium sulfur secondary batteries may be a lithium alloy. The lithium alloy may be a lithium alloy with a metal selected from Na, K, Rb, Cs, Fr, Be, Mg, Ca, Sr, Ba, Ra, Al, and Sn.

A lithium ion secondary battery may use a compound that allows reversible intercalation and deintercalation of lithium ions, as a cathode active material for the cathode 500. The cathode active material of the lithium ion secondary battery may be at least one selected from a lithium cobalt oxide, a lithium nickel cobalt manganese oxide, a lithium nickel cobalt aluminum oxide, a lithium iron phosphorus oxide, and a lithium manganese oxide, but is not limited thereof. Any suitable cathode active materials available in the art may be used.

The cathode active material may comprise at least one selected from lithium cobalt oxide ($LiCoO_2$); lithium nickel oxide ($LiNiO_2$); a lithium manganese oxide such as $Li_{1+x}Mn_{2-x}O_4$ (where x is in a range of 0 to 0.33), $LiMnO_3$, $LiMn_2O_3$, or $LiMnO_2$; lithium copper oxide ($Li_2CuO_2$); lithium iron oxide ($LiFe_3O_4$); lithium vanadium oxide ($LiV_3O_8$); copper vanadium oxide ($Cu_2V_2O_7$); vanadium oxide ($V_2O_5$); lithium nickel oxide ($LiNi_{1-x}M_xO_2$) (where M is Co, Mn, Al, Cu, Fe, Mg, B, or Ga, and x is in a range of 0.01 to 0.3); lithium manganese oxides, such as $LiMn_{2-x}M_xO_2$ (where M is Co, Ni, Fe, Cr, Zn, or Ta, and x is in a range of 0.01 to 0.1) or $Li_2Mn_3MO_8$ (where M is Fe, Co, Ni, Cu, or Zn); a lithium manganese oxide ($LiMn_2O_4$) with lithium partially substituted with alkali earth metal ions; a disulfide compound; and iron molybdenum oxide ($Fe_2(MoO_4)_3$).

A lithium ion secondary battery may use a material selected from Si, $SiO_x$ (where 0<x<2, for example, x=0.5 to 1.5), Sn, $SnO_2$, a silicon-containing metal alloy and a mixture thereof, as an anode active material for the anode 100. A metal able to form the silicon-containing metal alloy may be at least one selected from Al, Sn, Ag, Fe, Bi, Mg, Zn, in, Ge, Pb, and Ti.

Examples of the anode active material include a metal/metalloid alloyable with lithium, an alloy thereof, or an oxide thereof. Examples of the metal/metalloid alloyable with lithium are Si, Sn, Al, Ge, Pb, Bi, Sb, a Si—Y' alloy (where Y' may be an alkali metal, an alkaline earth metal, a Group 13 element, a Group 14 element, a transition metal, a rare-earth element, or a combination of these elements, except for Si), a Sn—Y" alloy (where Y" may be an alkali metal, an alkaline earth metal, a Group 13 element, a Group 14 element, a transition metal, a rare-earth element, or a combination of these elements, except for Sn), and $MnO_x$ (where 0<x≤2). For example, the element Y' may be at least one selected from magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), and polonium (Po). Non-limiting examples of oxides of the metal/metalloid alloyable with lithium are a lithium titanium oxide, a vanadium oxide, and a lithium vanadium oxide, $SnO_2$, and $SiO_x$ (where 0<x<2).

For example, the anode active material may include at least one element selected from a Group 13 element, a Group 14 element, and a Group 15 element of the periodic table of the elements. For example, the anode active material may include at least one element selected from Si, Ge, and Sn.

The anode active material may be a mixture or composite of a carbonaceous material with at least one selected from silicon, a silicon oxide, and a silicon-containing metal alloy as listed above.

In some embodiments, the anode active material may have a particulate form, or may be a nanostructure having a nanosize. For example, the anode active material may have any of a variety of forms, for example, nanoparticles, nanowires, nanorods, nanotubes, or nanobelts.

In some embodiments, a lithium ion secondary battery may include a separator and an electrolyte solution disposed between the cathode 500 and the anode 100. Examples of the separator and the electrolyte solution in the lithium ion secondary battery may be the same as those of the porous membrane and the electrolyte solution described above in conjunction with the embodiment of the anode assembly 300 of FIGS. 3D and 3E as being disposed between the composite layer 212 and the polymer electrolyte membrane 211 or between the polymer electrolyte membrane 211 and the anode 100 as an active metal.

Referring to FIG. 1A, the electrochemical cell 600 according to an embodiment may include: an anode assembly 300 having opposite first and second surfaces 205 and 207; and a cathode 500 that surrounds the anode assembly 300 and has at least one folded portion, such as first and second end portions 501 or 502, respectively, that are folded in the same direction as a folding direction of the anode assembly 300, and opposite first and second end portions 509 and 510, respectively, that are disposed on the opposite first and second surfaces 205 and 207 of the anode assembly 300, respectively, of the anode assembly 300, wherein the anode assembly 300 may include: an anode 100 having opposite first and second surfaces 105 and 107, respectively; and an active metal ion conducting membrane 200 that is disposed between the anode 100 and the cathode 500 to surround the anode 100 and has at least the first and second folded portion 201 and 202, and opposite first and second end portions 209 and 210 disposed on the opposite first and second surfaces 105 and 107, respectively, of the anode 100.

Figure 5:
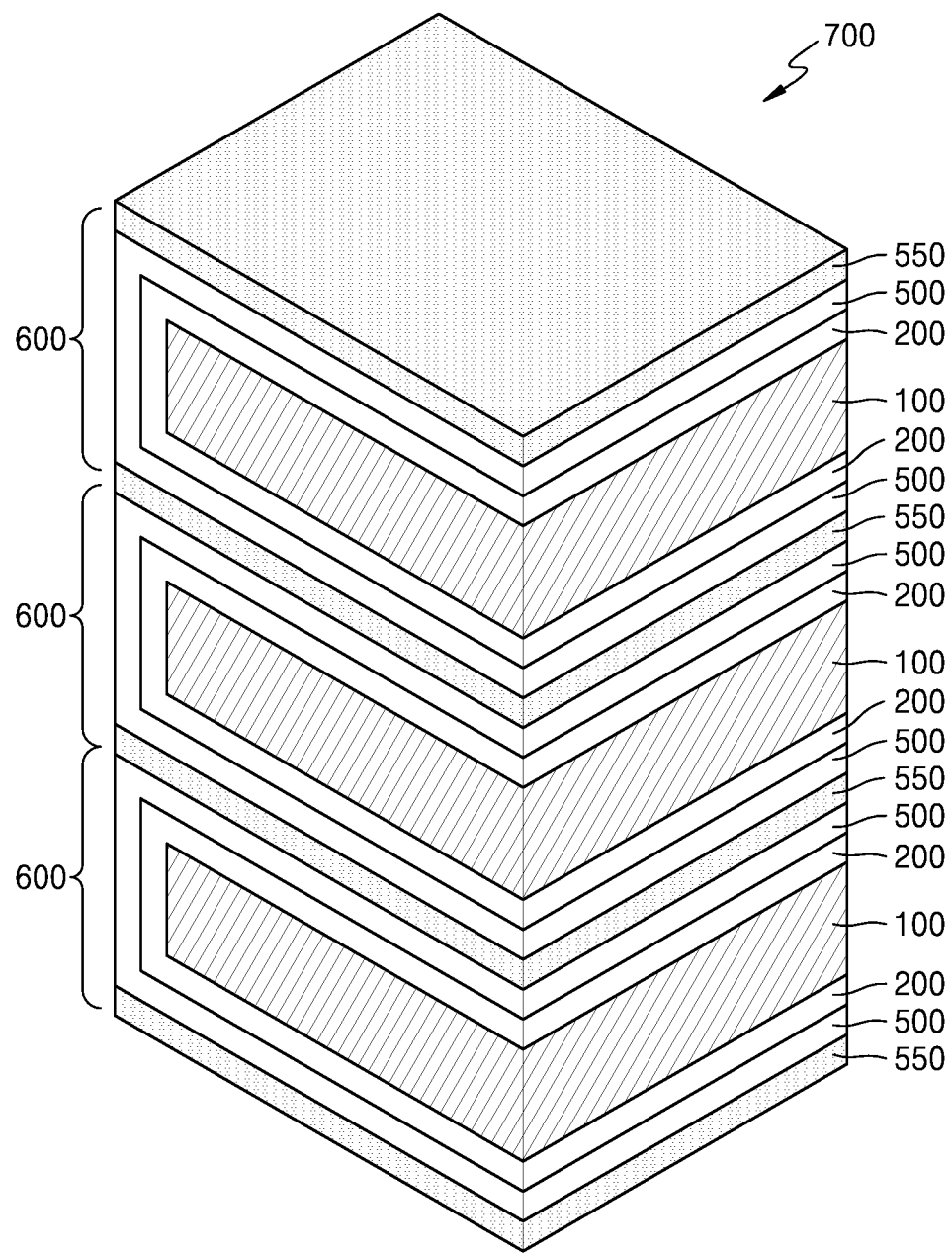
FIG. 5 is a schematic view illustrating a structure of an electrochemical cell module according to an embodiment.

Referring to FIG. 5, an electrochemical cell module 700 according to an embodiment may include; a plurality of electrochemical cells 600 as described above that are stacked upon one another; and at least one gas diffusion layer 550 disposed between opposing surfaces of each of the plurality of electrochemical cells 600 stacked upon one another.

Due to the presence of at least one gas diffusion layer 550 disposed between adjacent electrochemical cells 600 of the plurality of electrochemical cells stacked upon one another, simultaneous air supply to the plurality of electrochemical cells may be achieved, thus to improve the energy efficiency of the electrochemical cell module 700. As the number of electrochemical cells stacked upon one another is increased, the number of gas diffusion layers for each electrochemical cell may converge towards 1, on average, and thus the resulting electrochemical cell module may have improved energy density.

When the gas diffusion layer 550 having conductivity is disposed between every adjacent two of the electrochemical cells 600 stacked upon one another, the cathodes 500 of the electrochemical cells 600 may be electrically connected via the gas diffusion layers 550 having conductivity. Accordingly, only one cathode current collector may be enough to electrically connect the cathodes 500, so that the electrochemical cell module may have a simplified structure.

Figure 6A:
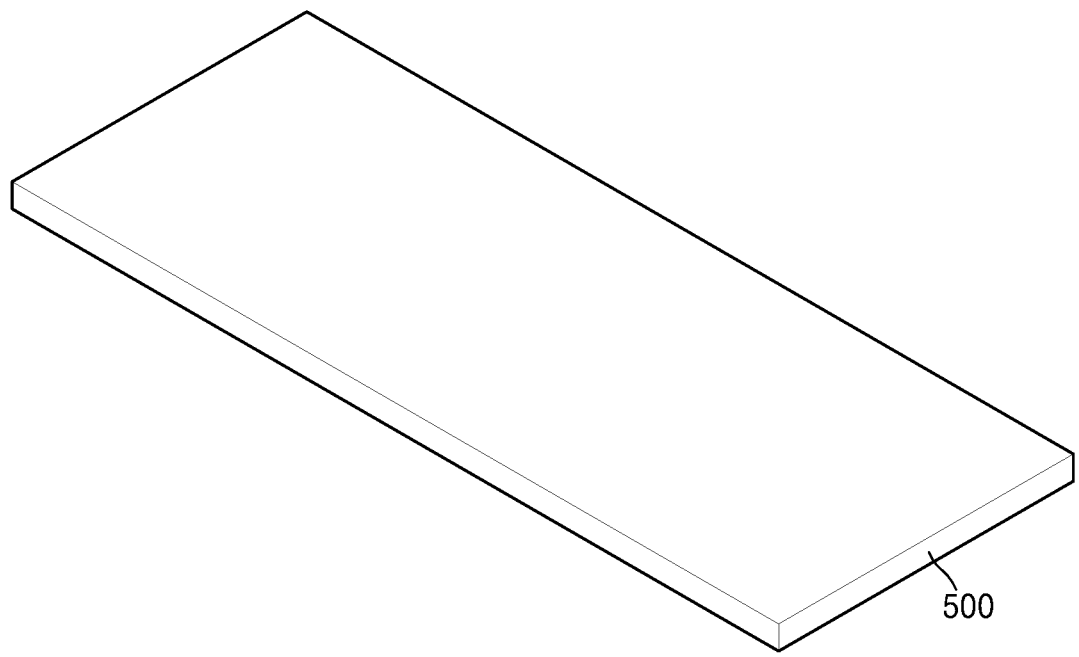
FIGS. 6A to 6F are schematic views illustrating a method of preparing an electrochemical cell, according to an embodiment of the present disclosure.
Figure 6B:
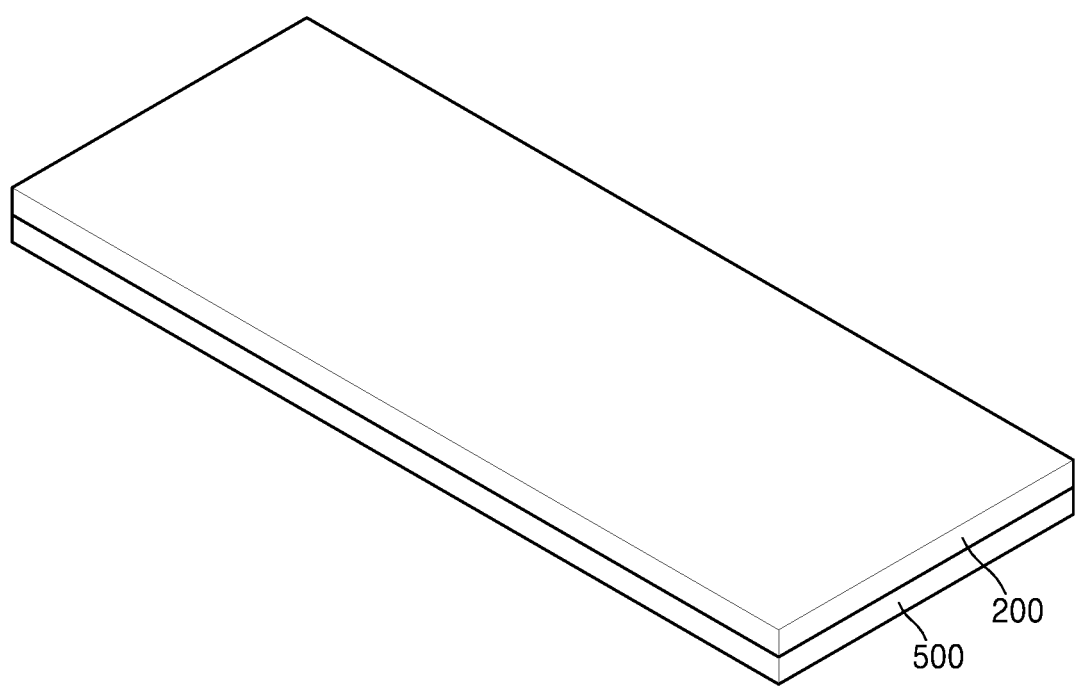
Figure 6C:
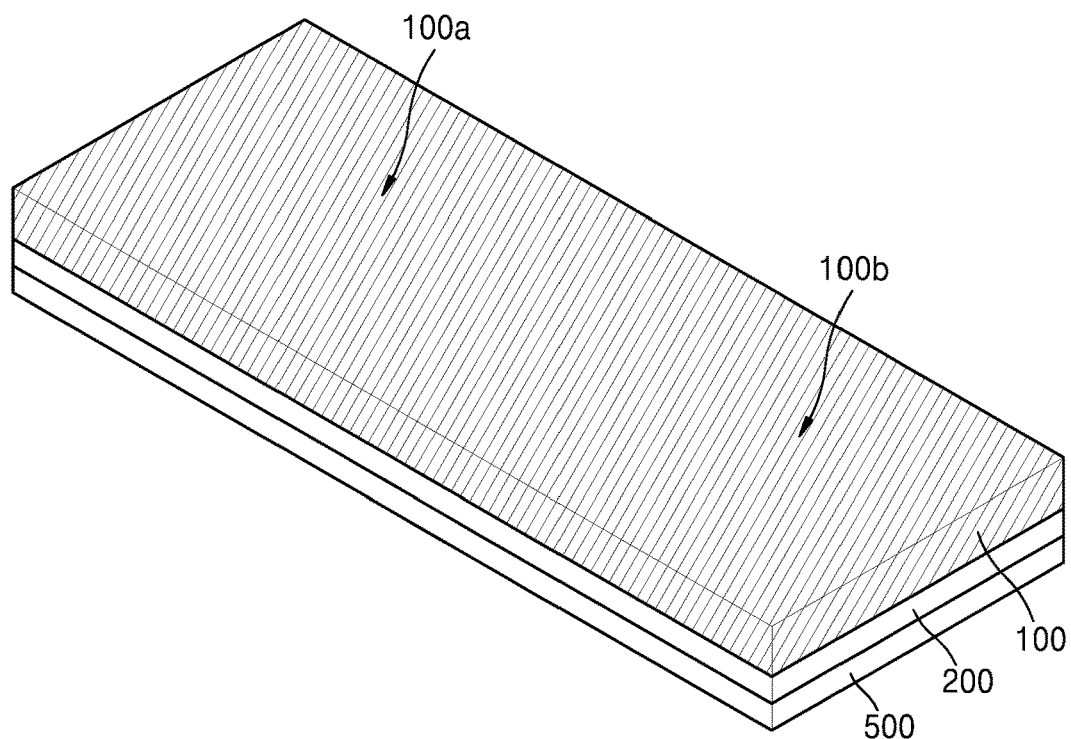
Figure 6D:
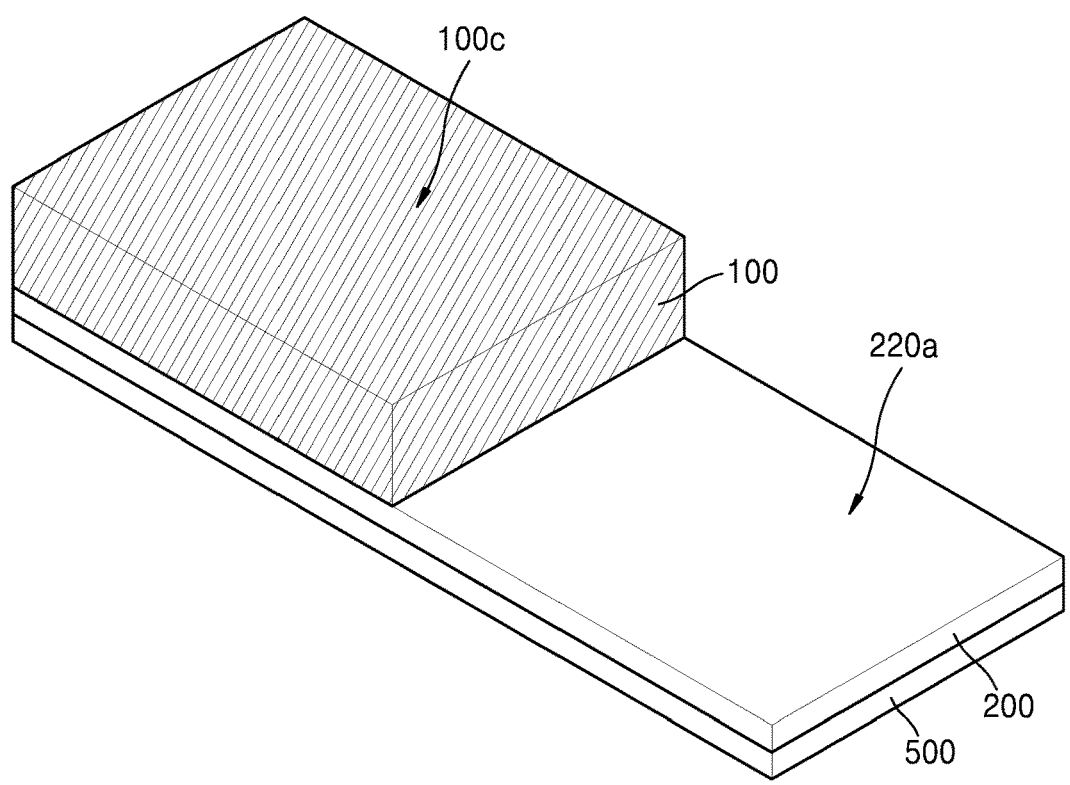

Referring to FIGS. 6A to 6E, a method of preparing an electrochemical cell 600, according to an embodiment, may include: providing a cathode 500; disposing, e.g., providing, an active metal ion conducting membrane 200 on a surface of the cathode 500; disposing, e.g., providing, an anode 100 on at least a part of a surface of the active metal ion conducting membrane 200; and folding the cathode 500 and active metal ion conducting membrane 200, and optionally the anode 100 at least one time to contact two separate spots 100a and 100b on a surface of the anode 100 (refer to FIG. 6C) or to contact a surface 100c of the anode 100 and a surface region 220a of the active metal ion conducting membrane 200 that is not covered by the anode 100 (refer to FIG. 6D). In an embodiment, the anode 100 may be disposed on the entirety of the surface of the active metal ion conducting membrane 200. In another embodiment, the anode 100 is disposed on a portion of the surface of the active metal ion conducting membrane 200. Also, in an embodiment, the folding comprises folding the cathode and the active metal ion conducting membrane to form a first contact and a second contact between the active metal ion conducting membrane and at least one of a first spot on a surface of the anode, a second spot on the surface of the anode, and a surface region of the active metal ion conducting membrane that is not disposed on the anode to prepare the electrochemical cell.

Figure 6E:
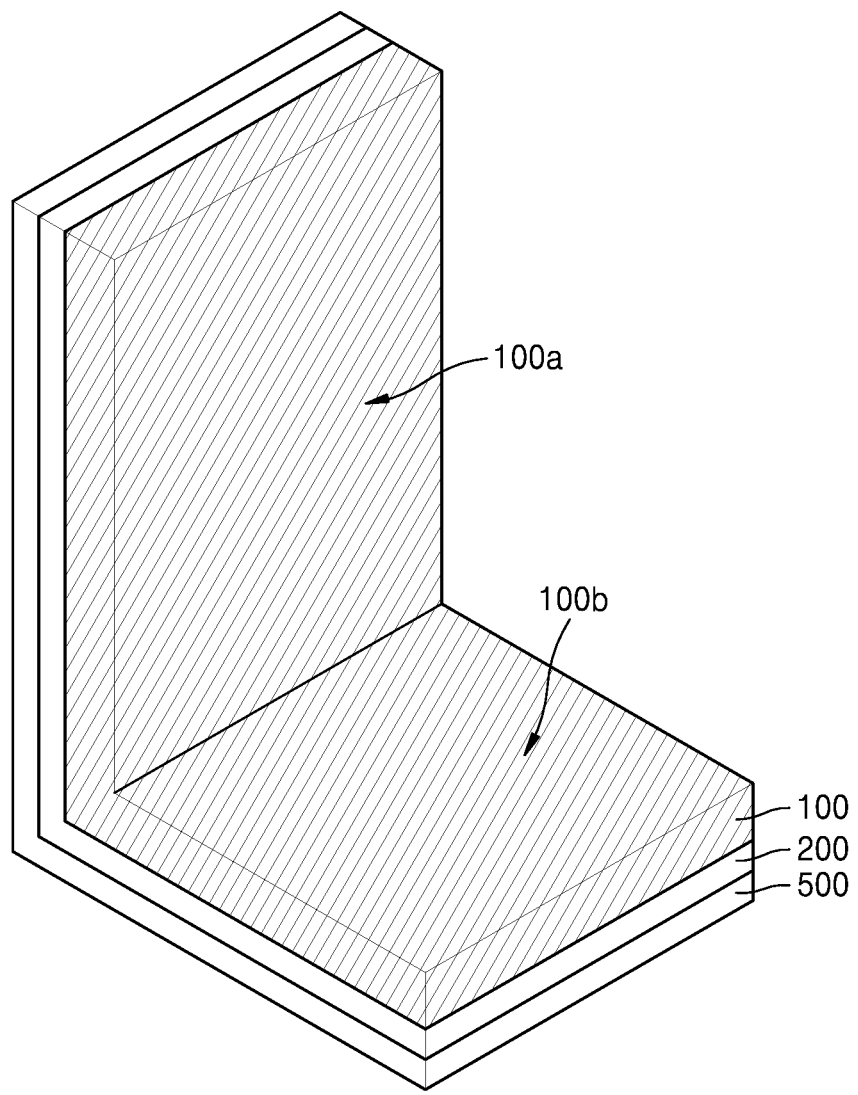

Referring to FIGS. 6A, 6B, 6C, 6E, and 6F, an electrochemical cell 600 according to an embodiment may be manufactured by providing a cathode 500; providing an active metal ion conducting membrane 200 on a surface of the cathode 500; providing an anode 100 on the entire surface of the active metal ion conducting membrane 200; and folding the cathode 500, the active metal ion conducting membrane 200 and the anode 100 at least one time to contact two separate spots 100a and 100b on a surface of the anode 100. FIG. 6E illustrates an intermediate step between the steps illustrated in FIGS. 6C and 6F.

Referring to FIGS. 6A, 6B, 6D, and 6F, an electrochemical cell 600 according to an embodiment may be manufactured by providing a cathode 500; providing an active metal ion conducting membrane 200 on a surface of the cathode 500; providing an anode 100 on a region of a surface of the active metal ion conducting membrane 200; and folding the cathode 500 and the active metal ion conducting membrane 200 at least one time to contact a surface 100c of the anode 100 and a surface region 220a of the active metal ion conducting membrane 200 that is not covered by the anode 100. In methods of preparing an electrochemical cell 600 according to an embodiment, the folding sites of the cathode 500 and the active metal ion conducting membrane 200, the number of folds, the folding direction, or the like may be appropriately selected depending on a shape of the electrochemical cell 600 to be formed.

In a method of preparing an electrochemical cell 600 according to an embodiment, the anode 100 may be provided without a support. The anode 100 may be provided on the active metal ion conducting membrane 200 without being supported by a support such as a carrier.

The providing the anode 100 without a support may improve the energy density of the electrochemical cell 600, due to a reduced volume and weight resulting from the elimination of the support.

For example, when a lithium metal is used as the anode 100, the lithium metal may be coated as a thin film on the active metal ion conducting membrane 200 using a doctor blade, or a lithium metal thin film as the anode 100 may be formed on the active metal ion conducting membrane 200.

In some embodiments, a method of preparing an electrochemical cell 600 as illustrated in FIG. 4A may further include hermetically sealing the edge portions 200a, 200b, and 200c of the active metal ion conducting membrane 200 folded to enclose the anode 100 therein, by heat-pressing. The hermetically sealing may result in a substantially impermeable housing 400 including an internal region that is hermetically sealed from an external region, while isolating the anode 100 from the cathode 500.

In some embodiments, a method of preparing an electrochemical cell 600, as illustrated in FIG. 4B, may further include hermetically sealing edge portions of the active metal ion conducting membrane 200 that is folded to enclose the anode 100 therein by placing seal structure to an interface between edge portions of the folded active metal ion conducting membrane. The seal structure 110 may be formed using a sealant and/or a multi-layer laminate (for example, aluminum laminate) having a polymer/metal/polymer structure. The hermetically sealing with the seal structure 110 may result in a substantially impermeable housing 400 including an internal region that is hermetically sealed from an external region, while isolating the anode 100 from the cathode 500.

In the electrochemical cell 600 of FIG. 4A or 4B, the anode 100 is isolated in the housing 400, while transportation of active metal ions into and out of the housing 400 is possible.

FIGS. 7A to 7E illustrate a method of manufacturing an anode assembly, according to an embodiment. Referring to FIGS. 7A to 7E, a method of manufacturing an anode assembly may include: providing an active metal ion conducting membrane 200; providing an anode 100 on at least a region of a surface of the active metal ion conducting membrane 200; and folding the active metal ion conducting membrane 200 at least one time to contact two separate spots 100a and 100b on a surface of the anode 100 (refer to FIG. 7B) or to contact a surface 100c of the anode 100 and a surface region 220a of the active metal ion conducting membrane 200 that is not covered by the anode 100 (refer to FIG. 7C). Detailed methods of manufacturing the anode assembly according to embodiments may be the same as the methods of manufacturing an electrochemical cell 600 described above.

In methods of preparing an anode assembly 300 according to an embodiment, the folding sites of the active metal ion conducting membrane 200, the number of folds, the folding direction, or the like may be appropriately selected depending on a shape of the target anode assembly 300.

An electrochemical cell according to the foregoing embodiment may be available either as a lithium primary battery or a lithium secondary battery. The electrochemical cell may have any of various shapes, and in some embodiments, may have a shape like a coin, a button, a sheet, a stack, a cylinder, a plane, or a horn. The electrochemical cell may be applicable as a large battery for electric vehicles.

As used herein, the term "air" is not limited to atmospheric air, and for convenience, may refer to a combination of gases including oxygen, or pure oxygen gas. This broad definition of "air" also applies to other terms, including "air battery" and "air electrode".

An embodiment will now be disclosed in further detail with reference to the following examples. However, these examples are only for illustrative purposes and shall not limit the scope of the present disclosure.

EXAMPLES

Manufacture of Lithium-Air Battery

Comparative Example 1: Manufacture of Conventional Lithium-Air Battery

Manufacture of Cathode 16.32 grams (g) of polyethylene oxide (PEO, Mw=600,000, available from Aldrich, 182028) was dissolved in 150 milliliters (mL) of acetonitrile to obtain a PEO solution. Then, LiTFSi was added to the PEO solution to reach a ratio of [EO] to [Li] of 18:1 by mole and stirred. The resulting solution was cast on a Teflon dish, dried at room temperature in a drying chamber for 2 days, and then further dried in a vacuum at about 80° C. overnight to remove the acetonitrile solvent, thereby obtaining a cathode electrolyte film.

Carbon black (Printex®, available from Orion Engineered Chemicals, USA) was dried in a vacuum at about 120° C. for about 24 hours.

The carbon black, polytetrafluoroethylene (PTFE) as a binder, and the cathode electrolyte film were weighed in a predetermined weight ratio, mechanically kneaded together, and then roll-pressed to form a cathode having a thickness of about 30 μm, followed by drying in an oven at about 60° C. and cutting into a rectangular cathode (2 cm×3 cm) having an area of about 6 cm². A weight ratio of carbon black to gel electrolyte in the cathode was about 1:5, and the amount of the binder was about 30 wt %.

Manufacture of Electrolyte Membrane

A porous separator (Celgard®) was impregnated with the same solution as used to form the cathode electrolyte film, dried at room temperature in a drying chamber for 2 days, and then further dried in a vacuum at about 60° C. overnight to remove the acetonitrile solvent, thereby obtaining a solid electrolyte membrane. The solid electrolyte membrane had a thickness of about 70 μm to about 90 μm.

Manufacture of Lithium-Air Battery

Figure 8A:
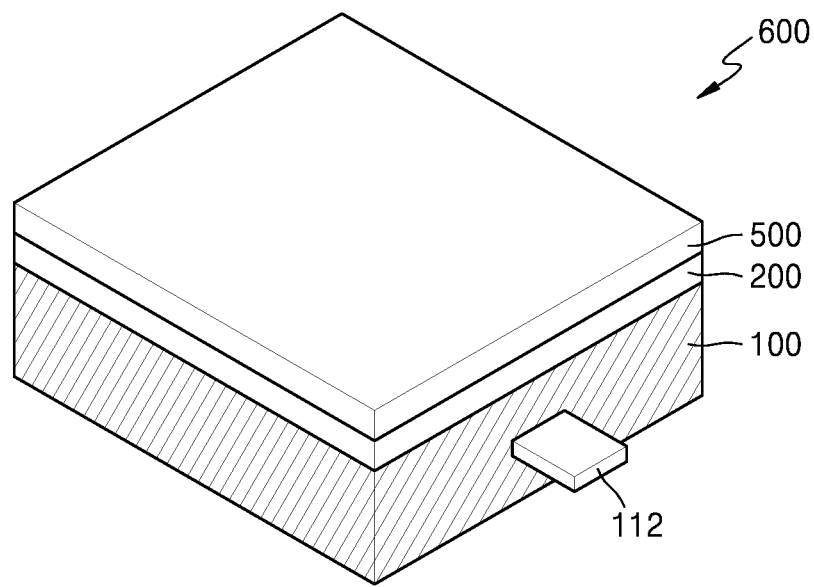
FIG. 8A is a schematic view illustrating a structure of an electrochemical cell not including a folded portion.

The electrolyte membrane (a size of 2 cm×3 cm) was disposed on a surface of the cathode, and a lithium metal (a size of 2 cm×3 cm) having a thickness of about 30 μm was then disposed on a surface of the electrolyte membrane, thereby to obtain a structure of cathode/electrolyte membrane/anode as illustrated in FIG. 8A, including the cathode and the lithium metal having the same area as the cathode being disposed on the opposite surfaces, respectively, of the electrolyte membrane.

Figure 8B:
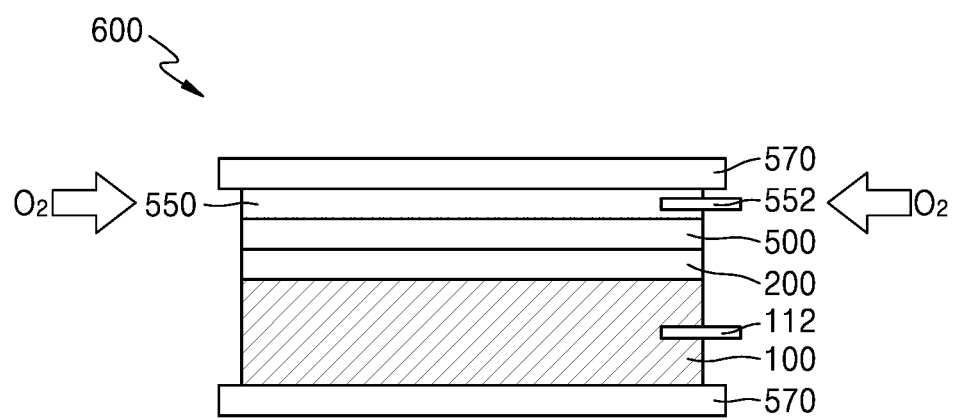
FIG. 8B is a schematic view illustrating a structure of an electrochemical cell not including a folded portion.

A Ni mesh as a cathode current collector was disposed on the cathode, and carbon paper (available from SGL, 35-DA) as a gas diffusion layer was disposed on the cathode current collector, thereby manufacturing a lithium-air battery as illustrated in FIGS. 8A and 8B. Finally, end plates were disposed on the gas diffusion layer and the anode (lithium metal), respectively. In the lithium-air battery, only one surface of the lithium metal (anode) contacts the electrolyte membrane.

Referring to FIGS. 8A and 8B, the manufactured lithium-air battery 600 as a conventional electrochemical cell had a structure including an anode 100 as lithium metal, an active metal ion conducting membrane 200 disposed on the anode 100, a cathode 500 disposed on the active metal ion conducting membrane 200, and a gas diffusion layer 550 disposed on the cathode 500, wherein end plates 570a and 570b are disposed on the upper and lower surfaces, respectively, of the electrochemical cell 600, e.g., a lithium-air battery. A cathode current collector 552 is disposed on a gas diffusion layer 550, and an anode current collector 112 is disposed on the anode 100. Air may be supplied through sides of the gas diffusion layer 550.

Example 1: Manufacture of Lithium-Air Battery

Manufacture of Cathode

A cathode (a size of 2 cm×3 cm) having an area of about 6 cm$^2$ was manufactured in the same manner as in Comparative Example 1.

Manufacture of Electrolyte Membrane

An electrolyte membrane (a size of 2.2 cm×3.4 cm) having an area of about 7.48 cm$^2$ was manufactured in the same manner as in Comparative Example 1.

Manufacture of Lithium-Air Battery

The electrolyte membrane was disposed on a surface of the cathode, and then a lithium metal (a size of 2 cm×3 cm) having a thickness of about 30 μm was disposed in the middle of a surface of the electrolyte membrane.

Figure 6F:
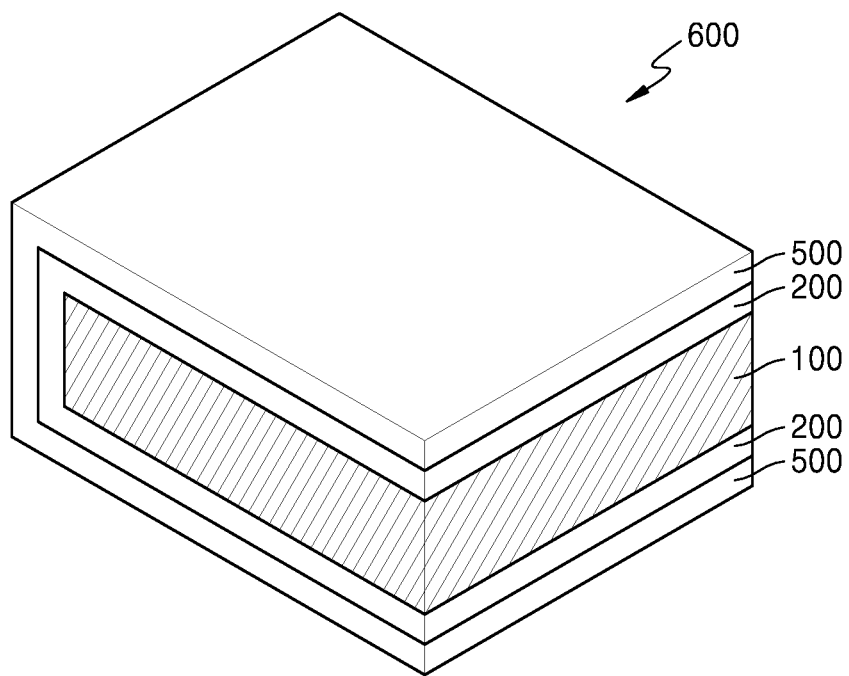
Figure 7A:
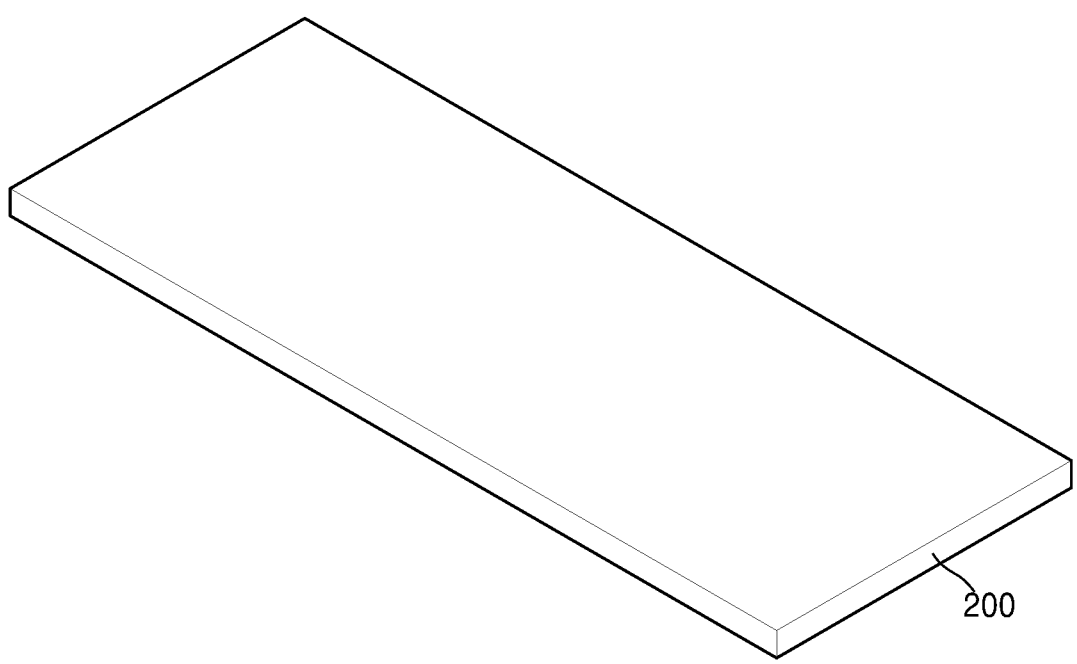
FIGS. 7A to 7E are schematic views illustrating a method of preparing an anode assembly, according to an embodiment of the present disclosure.
Figure 7B:
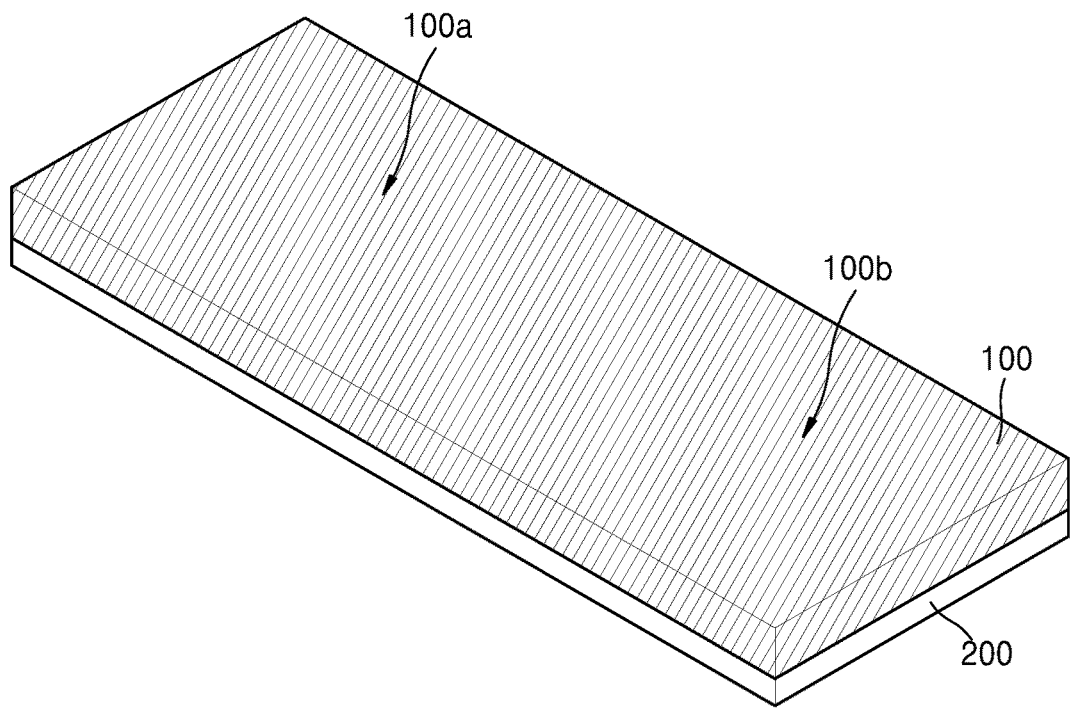
Figure 7C:
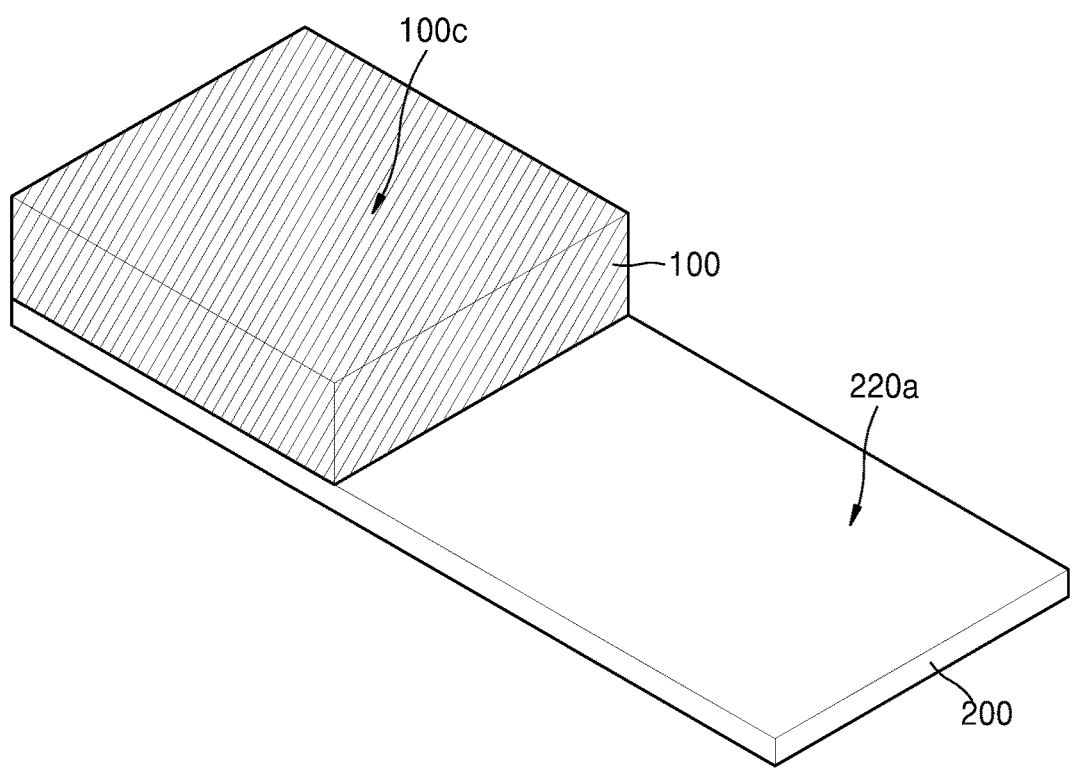
Figure 7D:
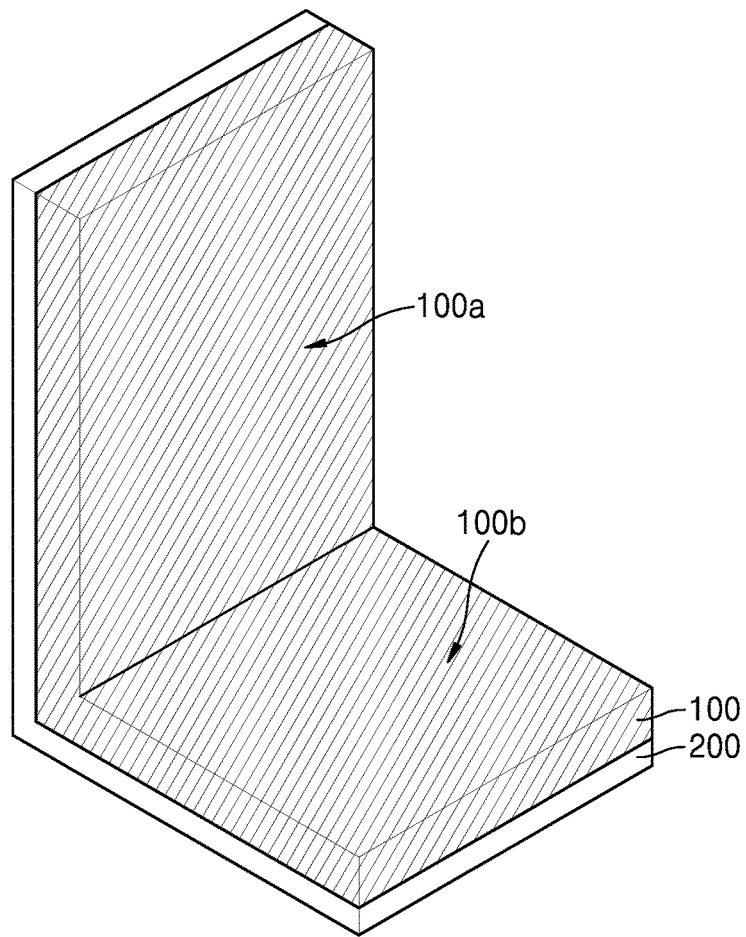
Figure 7E:
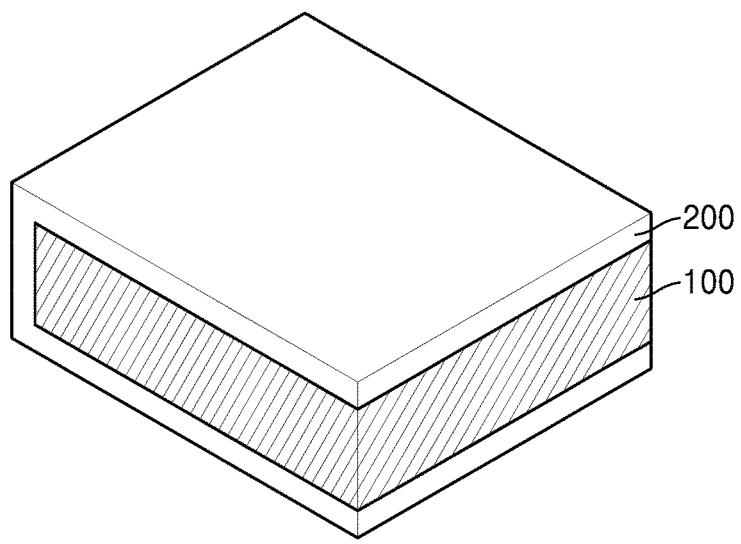

Subsequently, a resulting stack of lithium metal/electrolyte membrane/cathode was folded towards a surface of the lithium metal so as to contact two separate spots on the surface of the lithium metal, thereby manufacturing a lithium-air battery having a structure as illustrated in FIG. 6F. Prior to the folding, an anode current collector 112 as illustrated in FIG. 3A was connected to the lithium metal.

The area of the lithium metal was reduced by one-half to 3 cm$^2$ (1 cm×3 cm) as a result of the folding. The upper and lower surfaces of the lithium metal were surrounded and completely sealed by the electrolyte membrane having a larger size than the lithium metal.

Figure 9A:
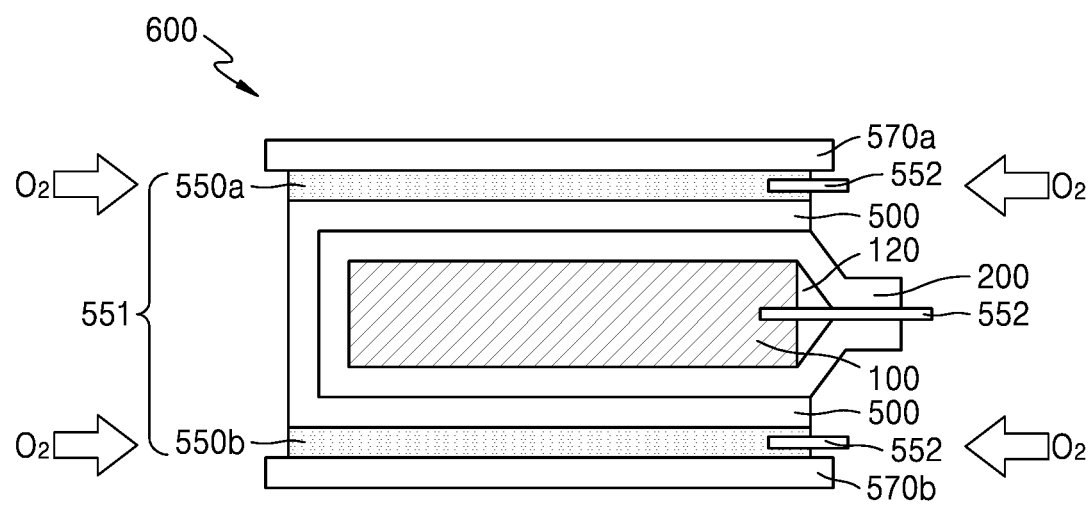
FIG. 9A is a schematic view illustrating a structure of an electrochemical cell.
Figure 9B:
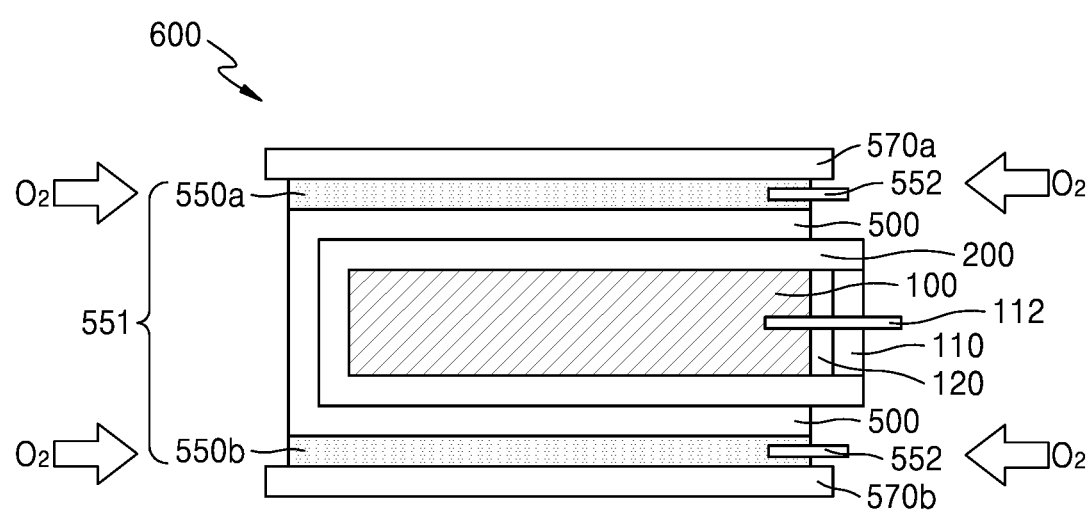
FIG. 9B is a schematic view illustrating a structure of an electrochemical cell.

A Ni mesh as a cathode current collector was disposed on at least one of the opposite surfaces of the cathode, and carbon paper (available from SGL, 35-DA) as a gas diffusion layer was disposed on the cathode current collector and/or the cathode, thereby manufacturing a lithium-air battery as illustrated in FIGS. 9A and 9B. Finally, end plates were disposed on the gas diffusion layers, respectively.

Referring to FIGS. 9A and 9B, the manufactured lithium-air battery 600 as an electrochemical cell 600 according to an embodiment of the present disclosure had a structure including an anode 100 as lithium metal, an active metal ion conducting membrane 200 surrounding the anode 100, a cathode 500 surrounding the active metal ion conducting membrane 200, and gas diffusion layers 550a and 550b disposed on the opposite surfaces of the cathode 500, respectively, wherein the anode 100 is hermetically sealed by the active metal ion conducting membrane 200 (refer to FIG. 9A) or a seal structure 110 (refer to FIG. 9B), and end plates 570a and 570b are disposed on the upper and lower surfaces, respectively, of the electrochemical cell 600, e.g., a lithium-air battery. Cathode current collectors 552 are disposed on the gas diffusion layers 550a and 550b, and an anode current collector 112 is disposed on the anode 100. Air may be supplied through sides 551 of the gas diffusion layers 550a and 550b.

Example 2: Manufacture of Lithium-Air Battery Module

A lithium-air battery module was manufactured in the same manner as in Example 1, except that three lithium-air batteries of Example 1 were stacked upon one another. The lithium-air battery module including three lithium-air batteries stacked upon one other had a structure as illustrated in FIG. 5.

Evaluation Example 1: Evaluation of Charge-Discharge Characteristics

Figure 10:
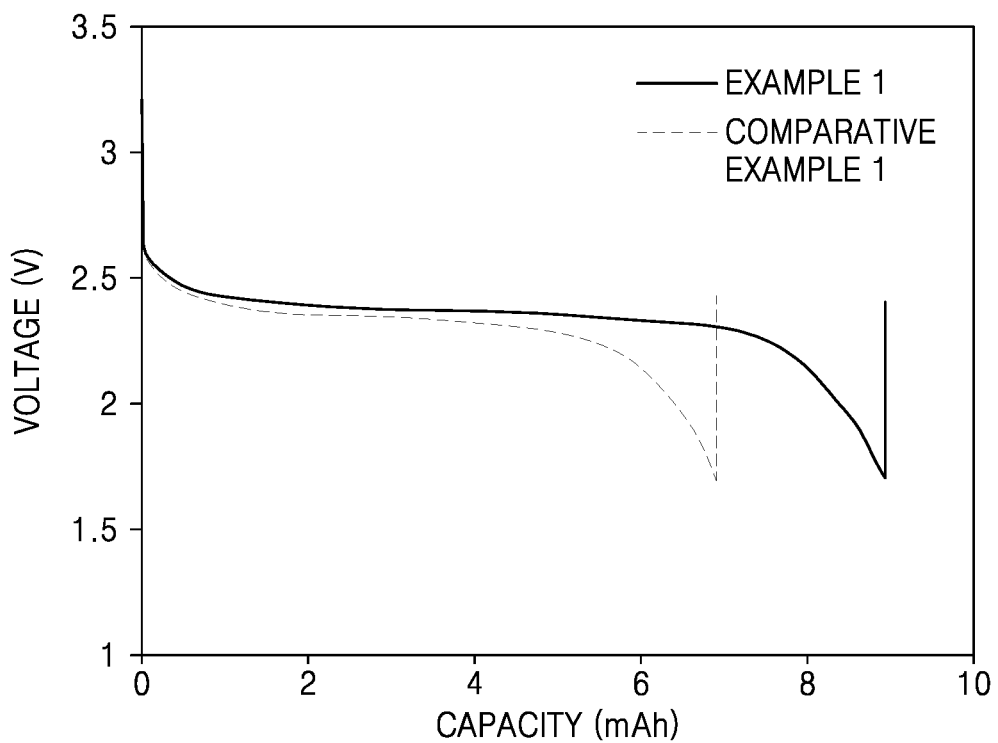
FIG. 10 is a graph of voltage (volts, V) versus discharge capacity (milliAmpere-hours) of the lithium-air batteries of Example 1 and Comparative Example 1.
Figure 11:
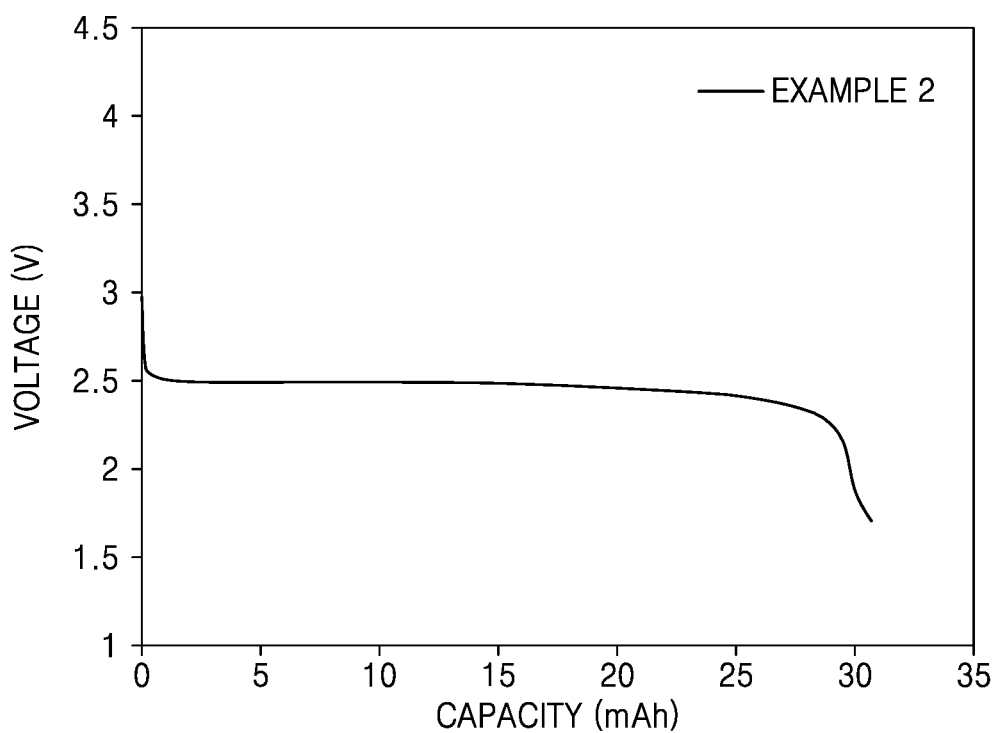
FIG. 11 is a graph of voltage (volts, V) versus discharge capacity (milliAmpere-hours) of a lithium-air battery module of Example 2.

The lithium-air batteries of Example 1 and Comparative Example 1 and the lithium-air battery module of Example 2 were discharged at about 60° C. in a 1 atm oxygen atmosphere with a constant current of about 0.24 mA/cm$^2$ to a voltage of about 1.7 V (with respect to Li), followed by discharge capacity measurement. The results are shown in Table 1 and FIGS. 10 and 11.

TABLE 1

| Example | Discharge capacity [mAh] |
|---|---|
| Example 1 | 8.9 |
| Example 2 | 30.7 |
| Comparative Example 1 | 6.9 |

Referring to Table 1, the lithium-air battery of Example 1 was found to have a higher discharge capacity by about 25% or more than the lithium-air battery of Comparative Example 1.

Such discharge capacity improvement in the lithium-air battery of Example 1 is attributed to the fact that the anode area reduction in the lithium-air battery of Example 1 by one-half of that of Comparative Example 1 led to a reduced flow path of air through the sides of the gas diffusion layer and consequently an increased oxygen concentration in the lithium-air battery of Example 1.

The lithium-air battery module of Example 2 including a stack of the three lithium-air batteries was found to have a higher discharge capacity by about three times or more than the lithium-air battery of Example 1.

As described above, according to the one or more embodiments of the present disclosure, an electrochemical cell may include an anode with two opposite surfaces on which an active metal ion conducting membrane and a cathode may be disposed, and thus may have improved discharge capacity and improved energy density.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An electrochemical cell comprising:
an anode assembly having opposite surfaces;
a cathode having at least one folded portion and having ionic continuity with the opposite surfaces of the anode assembly, wherein the cathode is disposed on the opposite outer surfaces of the anode assembly,
wherein the anode assembly comprises
an anode, and
an active metal ion conducting membrane that is disposed between the anode and the cathode, wherein the active metal ion conducting membrane has at least one folded portion; and
a gas diffusion layer disposed on opposite outer surfaces of the cathode,
wherein opposite side surfaces of the gas diffusion layer are in fluid communication with an outside of the electrochemical cell.

2. The electrochemical cell of claim 1, wherein the cathode surrounds the opposite surfaces of the anode assembly.

3. The electrochemical cell of claim 1, wherein the at least one folded portion of the cathode is folded in a same direction as a folding direction of the at least one folded portion of the active metal ion conducting membrane.

4. The electrochemical cell of claim 1, wherein opposite end portions of the cathode are disposed on the opposite surfaces of the anode assembly, respectively.

5. The electrochemical cell of claim 1, wherein the cathode surrounds the opposite surfaces of the anode assembly, and
wherein opposite end portions of the cathode are disposed on the opposite surfaces of the anode assembly, respectively.

6. The electrochemical cell of claim 1, wherein the anode has opposite surfaces, and
wherein the active metal ion conducting membrane has ionic continuity with the opposite surfaces of the anode.

7. The electrochemical cell of claim 6, wherein the active metal ion conducting membrane surrounds the opposite surfaces of the anode.

8. The electrochemical cell of claim 6, wherein opposite end portions of the active metal ion conducting membrane are disposed on the opposite surfaces of the anode, respectively.

9. The electrochemical cell of claim 6, wherein the active metal ion conducting membrane surrounds the opposite surfaces of the anode, and
wherein opposite end portions of the active metal ion conducting membrane are disposed on the opposite surfaces of the anode, respectively.

10. The electrochemical cell of claim 6, wherein the active metal ion conducting membrane forms a housing that is substantially impermeable to liquid and gas and defines an internal region which is hermetically sealed from an external region, and
wherein the active metal ion conducting membrane isolates the anode from the cathode.

11. The electrochemical cell of claim 10, wherein the active metal ion conducting membrane has a multi-layer structure.

12. The electrochemical cell of claim 6, further comprising a seal that interfaces with the active metal ion conducting membrane to enclose the anode therein, wherein the seal forms a housing that is substantially impermeable to liquid and gas and has an internal region which is hermetically sealed from an external region, and
wherein the active metal ion conducting membrane isolates the anode from the cathode.

13. The electrochemical cell of claim 12, wherein the seal is compliant with a thickness change of the anode and maintains physical contact with the anode.

14. The electrochemical cell of claim 12, wherein the seal comprises a polymer with the ability to block gas and moisture.

15. The electrochemical cell of claim 14, wherein the polymer with the ability to block gas and moisture is at least one selected from poly(2-vinylpyridine), polytetrafluoroethylene, a tetrafluoroethylene-hexafluoropropylene copolymer, polychlorotrifluoroethylene, a perfluoroalkoxy copolymer, a fluorinated cyclic ether, polyethylene oxide diacrylate, polyethylene oxide dimethacrylate, polypropylene oxide diacrylate, polypropylene oxide dimethacrylate, polymethylene oxide diacrylate, polymethylene oxide dimethacrylate, a poly(C1-C6alkyldiol diacrylate), a poly(C1-C6alkyldiol dimethacrylate), polydivinylbenzene, polyether, polycarbonate, polyamide, polyester, polyvinyl chloride, polyimide, polycarboxylic acid, polysulfonic acid, polyvinyl alcohol, polysulfone, polystyrene, polyethylene, polypropylene, poly(p-phenylene), polyacetylene, poly(p-phenylene vinylene), polyaniline, polypyrrole, polythiophene, poly(2,5-ethylene vinylene), polyacene, poly(naphthalene-2,6-diyl), polyethylene oxide, polypropylene oxide, polyvinylidene fluoride, vinylidene fluoride-hexafluoropropylene copolymer, poly(vinyl acetate), poly(vinyl butyral-co-vinyl alcohol-co-vinyl acetate), poly(methyl methacrylate-co-ethyl acrylate), polyacrylonitrile, polyvinyl chloride-co-vinyl acetate, poly(1-vinyl pyrrolidone-co-vinyl acetate), polyvinylpyrrolidone, polyacrylate, polymethacrylate, polyurethane, polyvinyl ether, an acrylonitrile-butadiene rubber, a styrene-butadiene rubber, an acrylonitrile-butadiene-styrene rubber, a sulfonated styrene/ethylene-butylene triblock copolymer, polyvinyl alcohol, polyamide, an epoxy resin, an acryl resin, and a polymerization product of at least one acrylate monomer selected from ethoxylated neopentyl glycol diacrylate, ethoxylated bisphenol A diacrylate, ethoxylated aliphatic urethane acrylate, an ethoxylated C1-C6 alkylphenol acrylate, and a C1-C6 alkyl acrylate.

16. The electrochemical cell of claim 1, wherein the active metal ion conducting membrane is an active metal ion conducting solid membrane.

17. The electrochemical cell of claim 1, wherein the active metal ion conducting membrane is a gas and moisture barrier membrane.

18. The electrochemical cell of claim 1, wherein the active metal ion conducting membrane is a composite membrane.

19. The electrochemical cell of claim 18, wherein the active metal ion conducting membrane comprises
an organic film having a plurality of pores, and
an ion-conductive polymer electrolyte disposed in the plurality of pores of the organic film.

20. The electrochemical cell of claim 19, wherein the ion-conductive polymer electrolyte comprises at least one selected from polyethylene oxide, polyvinyl alcohol, polyvinylpyrrolidone, and polysulfone.

21. The electrochemical cell of claim 19, wherein the active metal ion conducting membrane comprises
an organic film having a plurality of through holes, and
an ion-conductive inorganic particle which is disposed in the plurality of through holes of the organic film.

22. The electrochemical cell of claim 21, wherein the ion-conductive inorganic particle comprises at least one selected from a glassy metal ion conductor, an amorphous metal ion conductor, a ceramic active metal ion conductor, and a glass ceramic active metal ion conductor.

23. The electrochemical cell of claim 21, wherein the ion-conductive inorganic particle comprises at least one selected from $BaTiO_3$, $Pb(Zr_aTi_{1-a})O_3$ wherein $0 \leq a \leq 1$, $Pb_{1-x}La_xZr_{1-y}Ti_yO_3$ wherein $0 \leq x < 1$ and $0 \leq y < 1$, $Pb(Mg_{3}Nb_{2/3})O_3$—$PbTiO_3$, $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate, $Li_3PO_4$, lithium titanium phosphate, $Li_xTi_y(PO_4)_3$ wherein $0 < x < 2$ and $0 < y < 3$, lithium aluminum titanium phosphate, $Li_xAl_yTi_z(PO_4)_3$ wherein $0 < x < 2$, $0 < y < 1$, and $0 < z < 3$, $Li_{1+x+y}(Al_bGa_{1-b})_x(Ti_cGe_{1-c})_{2-x}Si_yP_{3-y}O_{12}$ wherein $0 \leq x \leq 1$, $0 \leq y \leq 1$, $0 \leq b \leq 1$, and $0 \leq c \leq 1$, lithium lanthanum titanate, $Li_xLa_yTiO_3$ wherein $0 < x < 2$ and $0 < y < 3$, lithium germanium thiophosphate, $Li_xGe_yP_zS_w$ wherein $0 < x < 4$, $0 < y < 1$, $0 < z < 1$, and $0 < w < 5$, a lithium nitride glass, $Li_xN_y$ wherein $0 < x < 4$ and $0 < y < 2$, a $SiS_2$ glass, $Li_xSi_yS_z$ wherein $0 < x < 3$, $0 < y < 2$, and $0 < z < 4$, a $P_2S_5$ glass, $Li_xP_yS_z$ wherein $0 < x < 3$, $0 < y < 3$, and $0 < z < 7$, $Li_2O$, LiF, LiOH, $Li_2CO_3$, $LiAlO_2$, a $Li_2O$—$Al_2O_3$—$SiO_2$—$P_2O_5$—$TiO_2$—$GeO_2$ ceramic, and $Li_{3+x}La_3M_2O_{12}$ wherein M comprises at least one selected from Te, Nb, and Zr.

24. The electrochemical cell of claim 19, wherein the organic film comprises a polymer with the ability to block gas and moisture.

25. The electrochemical cell of claim 1, wherein the anode comprises at least one selected from lithium, a lithium alloy, and a metal alloyable with lithium.

26. The electrochemical cell of claim 1, wherein the gas diffusion layer has ionic conductivity.

27. The electrochemical cell of claim 1, wherein the electrochemical cell is a metal-air battery or a lithium secondary battery.

28. An electrochemical cell module comprising:
a plurality of electrochemical cells according to claim 1 that are stacked upon one another; and
at least one gas diffusion layer disposed between neighboring surfaces of each of the electrochemical cells.

29. A method of preparing the electrochemical cell of claim 1, the method comprising:
providing the cathode;
disposing the active metal ion conducting membrane on a surface of the cathode;
disposing the anode on a surface of the active metal ion conducting membrane; and
folding the cathode and the active metal ion conducting membrane to form a first contact and a second contact between the active metal ion conducting membrane and at least one of a first spot on a surface of the anode, a second spot on the surface of the anode, and a surface region of the active metal ion conducting membrane that is not disposed on the anode to prepare the electrochemical cell; and
disposing the gas diffusion layer disposed on the opposite outer surfaces of the cathode.

30. The method of claim 29, wherein the anode is provided without a support.

31. The method of claim 29, further comprising hermetically sealing edge portions of the folded active metal ion conducting membrane to enclose the anode, wherein the hermetically sealing comprises heat-pressing the active metal ion conducting membrane.

32. The method of claim 29, further comprising
disposing a seal between edge portions of the folded active metal ion conducting membrane to hermetically seal edge portions of the folded active metal ion conducting membrane to enclose the anode therein interface.

33. An electrochemical cell comprising:
an anode assembly having opposite first and second surfaces; and
a cathode surrounding the anode assembly and having
at least one folded portion that is folded in a same direction as a folding direction of the anode assembly, and
opposite first and second end portions disposed on the opposite first and second surfaces of the anode assembly, respectively, and
wherein the cathode is disposed on the opposite outer surfaces of the anode assembly,
wherein the anode assembly comprises
an anode having opposite first and second surfaces; and
an active metal ion conducting membrane that is disposed between the anode and the cathode, surrounds the anode, and has at least one folded portion and opposite first and second end portions which are disposed on the opposite first and second surfaces of the anode, respectively; and
a gas diffusion layer disposed on opposite outer surfaces of the cathode
wherein opposite side surfaces of the gas diffusion layer are in fluid communication with an outside of the electrochemical cell.

* * * * *